(12) United States Patent
Card, II et al.

(10) Patent No.: US 10,645,439 B2
(45) Date of Patent: May 5, 2020

(54) EXTERNAL ACCESSIBILITY SYSTEMS AND METHODS

(71) Applicant: DISH Technologies L.L.C., Englewood, CO (US)

(72) Inventors: John Anthony Card, II, Denver, CO (US); Ellen Letendre, Englewood, CO (US); Karen Taxier, Highlands Ranch, CO (US)

(73) Assignee: DISH Technologies L.L.C., Englewood, CO (US)

( * ) Notice: Subject to any disclaimer, the term of this patent is extended or adjusted under 35 U.S.C. 154(b) by 386 days.

(21) Appl. No.: 15/217,735

(22) Filed: Jul. 22, 2016

(65) Prior Publication Data
US 2018/0024845 A1 Jan. 25, 2018

(51) Int. Cl.
*G06F 3/0484* (2013.01)
*H04N 21/422* (2011.01)
(Continued)

(52) U.S. Cl.
CPC ....... *H04N 21/42203* (2013.01); *G06F 3/016* (2013.01); *G06F 3/0304* (2013.01); *G06F 3/167* (2013.01); *G06F 9/451* (2018.02); *G09B 21/007* (2013.01); *H04N 21/4126* (2013.01); *H04N 21/4223* (2013.01); *H04N 21/4318* (2013.01); *H04N 21/440236* (2013.01); *H04N 21/4622* (2013.01); *H04N 21/4884* (2013.01);
(Continued)

(58) Field of Classification Search
CPC ...... G06F 3/14; G06F 3/0484; G06F 3/04842; G06F 3/0488; G06F 3/016; G06F 3/1415; G06F 9/4443; G06F 9/4448; G06F 9/454; G06F 9/451
See application file for complete search history.

(56) References Cited

U.S. PATENT DOCUMENTS 8,964,298 B2 2/2015 Haddick et al.
9,282,367 B2 3/2016 Daub
(Continued)

OTHER PUBLICATIONS

U.S. Appl. No. 15/395,235, filed Dec. 30, 2016 Final Rejection dated Jun. 5, 2018, all pages.
U.S. Appl. No. 15/395,235, filed Dec. 30, 2016, Non-Final Office Action dated Dec. 27, 2017, all pages.
U.S. Appl. No. 15/395,235, filed Dec. 30, 2016, Non Final Office Action dated Oct. 3, 2018, all pages.
(Continued)

*Primary Examiner* — Andrea C Leggett
(74) *Attorney, Agent, or Firm* — Kilpatrick Townsend & Stockton LLP

(57) ABSTRACT

Described are systems, methods and computer program products for generating accessible interface elements to facilitate presentation of alternative versions of a user interface or portions thereof to a user, such as a user having a disability. The disclosed systems, methods, and products allow users having a disability to more easily interact with and/or understand the user interfaces of consumer electronic devices. The disclosed systems, methods, and computer program products may facilitate obtaining images of the user interface and analyzing the images to convert, modify, or otherwise generate an accessible interface, or a portion thereof, for presentation to the user. For example, alternative interface presentations may be generated to allow a blind, deaf, low-vision, or color blind user to more easily understand and interact with the user interface.

20 Claims, 12 Drawing Sheets

(51) Int. Cl.

| | |
|---|---|
| *G06F 3/01* | (2006.01) |
| *G06F 3/16* | (2006.01) |
| *H04N 21/431* | (2011.01) |
| *H04N 21/81* | (2011.01) |
| *H04N 21/488* | (2011.01) |
| *H04N 21/41* | (2011.01) |
| *H04N 21/4223* | (2011.01) |
| *G06F 9/451* | (2018.01) |
| *H04N 21/4402* | (2011.01) |
| *H04N 21/462* | (2011.01) |
| *G09B 21/00* | (2006.01) |
| *G06F 3/03* | (2006.01) |
| *G06F 3/14* | (2006.01) |
| *G06F 3/0488* | (2013.01) |
| *G10L 17/00* | (2013.01) |

(52) U.S. Cl.
CPC ....... *H04N 21/8106* (2013.01); *G06F 3/0488* (2013.01); *G06F 3/1423* (2013.01); *G06F 9/454* (2018.02); *G09G 2370/18* (2013.01); *G10L 17/00* (2013.01)

(56) References Cited

U.S. PATENT DOCUMENTS

| | | |
|---|---|---|
| 9,465,451 B2 | 10/2016 | Ortiz et al. |
| 2007/0124775 A1* | 5/2007 | DaCosta ............ H04N 7/17318 |
| | | 725/62 |
| 2010/0046842 A1 | 2/2010 | Conwell |
| 2012/0291073 A1 | 11/2012 | Friedman |
| 2012/0311623 A1 | 12/2012 | Davis et al. |
| 2013/0019250 A1 | 1/2013 | Ng et al. |
| 2013/0282532 A1 | 10/2013 | Shihadah et al. |
| 2014/0245335 A1 | 8/2014 | Holden et al. |
| 2014/0267770 A1 | 9/2014 | Gervautz et al. |
| 2014/0317659 A1 | 10/2014 | Yasutake |
| 2015/0015784 A1 | 1/2015 | Minnick et al. |
| 2016/0019618 A1 | 1/2016 | Lin et al. |
| 2016/0088358 A1 | 3/2016 | Garcia Navarro |

OTHER PUBLICATIONS

U.S. Appl. No. 15/395,235, filed Dec. 30, 2016 Final Rejection dated Feb. 5, 2019, all pages.

* cited by examiner

EXTERNAL ACCESSIBILITY SYSTEMS AND METHODS

FIELD

This application relates generally to the presentation of accessible features to users. More particularly, this application relates to methods and system for converting non-accessible user interfaces to accessible forms.

BACKGROUND

Consumer electronic device user interfaces may be difficult to use by users with certain disabilities. As an example, a blind user may find navigating a user interface for a consumer electronic device impossible without the aid of tactile or audio feedback. Various consumer electronic devices may directly implement accessible features for users with some disabilities (e.g., closed captioning for deaf users), while users with other disabilities may find the features of the consumer electronic devices so lacking that the users may not be able to operate the devices.

SUMMARY

Described herein are systems, methods, and computer program products for generating accessible interface elements to facilitate presentation of alternative versions of a user interface or portions thereof to a user, such as a user having a disability. The disclosed systems, methods, and products allow users having a disability to more easily interact with and/or understand the user interfaces of consumer electronic devices.

Advantageously, the disclosed systems, methods, and products permit non-accessible consumer electronic devices to provide an accessible interface to a user having a disability without requiring changes to the user interfaces of the consumer electronic devices. This may be achieved, for example, by obtaining images of the user interface and analyzing the images to convert, modify, or otherwise generate an accessible interface, or a portion thereof, for presentation to the user. For example, alternative interface presentations may be generated to allow a blind, deaf, low-vision, or color blind user to more easily understand and interact with the user interface.

Inputs may be provided by the user, which may correspond to desired commands to be forwarded to the consumer electronic device. In this way, the systems, methods, and products provided herein may be useful for facilitating user interaction with a consumer electronic device.

In a first aspect, methods are provided. In some embodiments, a method of this aspect comprises obtaining, for example by a computing device, such as an accessibility system, an image of a graphical interface using an image capture device, such as a graphical interface that corresponds to a consumer electronic device different from the computing device; analyzing the image to identify an interface element; generating an accessible interface element using the interface element, such as an accessible interface element that corresponds to a different presentation of the interface element to facilitate use by a user; and outputting an audio or visual output of the accessible interface element. Optionally, the interface element corresponds to a focusable element of the graphical interface. Optionally, the interface element corresponds to a nonfocusable element of the graphical interface.

In some embodiments, a user may interact with the computing device, such as by providing inputs, which may be useful for controlling or intended to control the computing device or the consumer electronic device. In some embodiments, a method of this aspect further comprises receiving input corresponding to identification of the interface element; and wirelessly transmitting a command to facilitate selection of the interface element in the graphical interface. Optionally, wirelessly transmitting the command includes transmitting the command using an infrared signal, transmitting the command using a radio frequency signal, transmitting the command using a WiFi signal, transmitting the command using a Bluetooth signal, transmitting the command using a Consumer Electronics Control signal, and any combination of these. In some embodiments, methods of this aspect may optionally further comprise receiving the command at an actuation device; and actuating a physical input device using the actuation device to facilitate selection of the interface element in the graphical interface.

Feedback to the user may optionally be provided to the user to indicate that input was received or that a command was transmitted. For example, methods of this aspect may optionally further comprise outputting a second audio or visual output to confirm selection of the interface element or outputting a tactile output to confirm selection of the interface element.

In some embodiments, additional input may be provided. For example, methods of this aspect may optionally further comprise receiving input corresponding to selection of a second interface element; generating a second accessible interface element using the second interface element to facilitate use by the user; and outputting a second audio or visual output of the second accessible interface element. Optionally, receiving input includes receiving input via a touch-based, motion-based, or voice-based input device. Optionally, the second interface element corresponds to a portion of the graphical interface. Optionally, the second interface element corresponds to a focusable element of the graphical interface. Optionally, the second interface element corresponds to a nonfocusable element of the graphical interface. Optionally, a method of this aspect may further comprise receiving input corresponding to selection of a second interface element; and receiving input corresponding to a command to ignore the second interface element.

In some embodiments, methods of this aspect may perform image analysis to identify the interface element. For example, analyzing the image optionally includes identifying text in the graphical interface. Alternatively or additionally, analyzing the image includes identifying element focus in the graphical interface. For example, some methods of this aspect may further comprise obtaining a second image of the graphical interface using the image capture device; analyzing the image of the graphical interface and the second image of the graphical interface to identify a change to the graphical interface; and determining element focus in the graphical interface based on the change.

Optionally, the computing device comprises the image capture device. Optionally, image capture device is remote from and in data communication with the computing device. For example, a standalone image capture device may be used with methods of this aspect, such as to facilitate continued or uninterrupted viewing of the graphical interface corresponding to the consumer electronic device.

A variety of graphical interfaces may be useful with the methods of this aspect. For example, in some embodiments, the graphical interface corresponds to a television receiver interface. A variety of consumer electronics devices may be useful with the methods of this aspect. For example, the consumer electronics device may be or include, but is not limited to, a TV, a television receiver, a set top box, an over-the-air receiver, an over-the-top receiver, a VCR, a DVR, a DVD player, a Blu-ray player, a Laserdisc player, a video game console, an audio receiver, an HVAC system, a security system, and a home automation system.

A variety of accessible interface elements may be generated by the methods of this aspect. For example, useful accessible interface elements include, but are not limited to, an audio version of the interface element, a text version of an audio interface element, an alternative color version of the interface element, a magnified version of the interface element, a simplified language version of the interface element, a translated language version of the interface element, a version of text having a second font size greater than a first font size of text in the interface element, a version of text having a second texture different from a first texture of text in the interface element, a version of text having a second font style different from a first font style of text in the interface element. Other examples are possible.

In some embodiments, the methods of this aspect provide for a configurable generation of accessible interface elements, such as to facilitate presentation and/or use of the graphical interface by a particular user, such as a particular user having one or more disabilities. In some embodiments, for example, methods of this aspect may further comprise generating a graphical interface providing a selectable element, such as a selectable element that corresponds to a type of the accessible interface element; receiving input corresponding to a particular selection of the selectable element, such that generating the accessible interface element includes using the interface element and the type corresponding to the particular selection of the selectable element. Useful types may correspond to different versions of the accessible interface elements, such as a version useful for a deaf user, a blind user, a low vision user, or a color blind user.

In some embodiments, methods of this aspect are useful for determining contextual aspects of the graphical interface or programming showed by the consumer electronic device and providing additional information about the contextual aspects to the user. For example, text or audio may be analyzed to determine and provide a meaning or origin of the words in the text or audio, or an actor may be identified to determine and provide identity information or other related information about the actor to the user. In some embodiments, for example, methods of this aspect may further comprise obtaining audio output generated by the consumer electronic device using an audio capture device; analyzing the audio to identify a contextual element in the audio; generating an accessible contextual element using the contextual element, such as where the accessible contextual element corresponds to a different presentation of the contextual element to facilitate presentation to the user; and outputting an audio or visual output of the accessible contextual element. For example, the contextual element optionally corresponds to spoken language and the accessible contextual element optionally corresponds to a text version of the spoken language, a simplified language version of the spoken language, or a translated language version of the spoken language. Optionally, the contextual element corresponds to a stream of a spoken language and the accessible contextual element corresponds to a streaming text version of the spoken language, a streaming simplified language version of the spoken language, or a streaming translated language version of the spoken language.

Optionally, analyzing the audio includes performing voice or speech recognition on the audio to determine identities or a number of speakers in the audio. Optionally, analyzing the audio includes performing voice or speech recognition on the audio to determine an identity of a speaker in the audio, and wherein generating the accessible contextual element includes obtaining information regarding the speaker. Optionally, analyzing the audio includes performing voice or speech recognition on the audio to determine a spoken language content of the audio, and wherein generating the accessible contextual element includes obtaining information regarding the spoken language content.

In some embodiments, methods of this aspect may further comprise obtaining a second image corresponding to a video presentation of the consumer electronic device using the image capture device; analyzing the second image to identify a contextual element; generating an accessible contextual element using the contextual element, such as where the accessible contextual element corresponds to a different presentation of the contextual element to facilitate presentation to the user; and outputting an audio or visual output of the accessible contextual element. Optionally, the contextual element corresponds to written language and wherein the accessible contextual element corresponds to a magnified version of the written language, an alternatively colored version of the written language, a simplified language version of the written language, a different font texture or font style from the written language, or a translated language version of the written language. Optionally, analyzing the second image includes performing text recognition on the second image to determine written language depicted in the second image. Optionally, analyzing the second image includes performing facial recognition on the second image to determine identities or a number of persons depicted in the second image. Optionally, analyzing the second image includes performing facial recognition on the second image to determine an identity of a person depicted in the image, and generating the accessible contextual element includes obtaining information regarding the person using the identity.

In another aspect, systems are provided. System of various embodiments provided herein may perform any of the above methods. For example, systems of various embodiments may include one or more processors; and a non-transitory computer readable storage medium in data communication with the one or more processors, wherein non-transitory computer readable storage medium includes processor-readable instructions that, when executed by the one or more processors, cause the one or more processors to perform operations including, such as operations corresponding to the above described methods. In some embodiments, the operations include obtaining an image of a graphical interface using an image capture device, such as a graphical interface that corresponds to a consumer electronic device different from the system; analyzing the image to identify an interface element; generating an accessible interface element using the interface element, such as an accessible interface element corresponds to a different presentation of the interface element to facilitate use by a user; and outputting an audio or visual output of the accessible interface element.

Systems of this aspect may include additional components. For example, a system may optionally further comprises the image capture device, such as where the image capture device is positioned in data communication with the one or more processors. Additionally or alternatively, a system may further comprise an audio capture device, such as an audio capture device positioned in data communication with the one or more processors.

It will again be appreciated that the systems of this aspect may optionally perform any of the methods described above. For example, the instructions stored on the non-transitory computer readable medium, when executed by the one or more processors, may cause the one or more processors to perform any of the methods described above.

In another aspect, receivers are provided. In some embodiments, a receiver of this aspect may correspond to a television receiver, such as a cable television receiver, a satellite television receiver, an over-the-air receiver, an over-the-top receiver, or some other set-top-box type of receiver. In some embodiments, the receiver is directly integrated into a television or other display device, such as a smartphone, laptop, personal computer, tablet computer, etc. In embodiments, a receiver of this aspect may comprise one or more processors; an audio-video output interface in data communication with the one or more processors; a network interface in data communication with the one or more processors; and a non-transitory computer readable storage medium in data communication with the one or more processors. Optionally, the non-transitory computer readable storage medium includes processor-readable instructions that, when executed by the one or more processors, cause the one or more processors to perform operations including establishing a data connection with a remote computing device using the network interface; generating a graphical interface for output by a presentation device using the audio-video output interface; identifying an interface element of the graphical interface; generating an accessible interface element using the interface element, such as an accessible interface element that corresponds to a different presentation of the interface element to facilitate use by a user; and transmitting, using the network interface, a signal providing the accessible interface element to the remote computing device to facilitate an audio or visual presentation of the accessible interface element to a user.

Optionally, the accessible interface element corresponds to an audio version of the interface element. Optionally, the accessible interface element corresponds to a magnified version of the interface element. Optionally, the accessible interface element corresponds to an alternative color version of the interface element. Optionally, the accessible interface element corresponds to a simplified language version of the interface element. Optionally, the accessible interface element corresponds to a translated language version of the interface element. Optionally, the accessible interface element corresponds to a version of text having a second font size greater than a first font size of text in the interface element. Optionally, the accessible interface element corresponds to a version of text having a second font style different from a first font style of text in the interface element. Optionally, the accessible interface element corresponds to a version of text having a second texture different from a first texture of text in the interface element.

In some embodiments, the operations may further include analyzing audio received at or generated by the receiver to identify a contextual element in the audio; generating an accessible contextual element using the contextual element, such as where the accessible contextual element corresponds to a different presentation of the contextual element to facilitate presentation to the user; and transmitting, using the network interface, a signal providing the accessible contextual element to the remote computing device to facilitate an audio or visual presentation of the accessible interface element to the user.

In some embodiments, the operations may further include analyzing video received at or generated by the receiver to identify a contextual element in the video; generating an accessible contextual element using the contextual element, such as where the accessible contextual element corresponds to a different presentation of the contextual element to facilitate presentation to the user; and transmitting, using the network interface, a signal providing the accessible contextual element to the remote computing device to facilitate an audio or visual presentation of the accessible interface element to the user.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In embodiments, the present invention provides systems, methods, and computer program products for facilitating conversion of user interfaces to accessible interfaces, such as to allow for more simple or to otherwise enable a user having a disability to use the user interface. In embodiments, the systems, methods, and computer program products make use of captured images of a user interface and analyze the images to identify elements to be converted to an accessible form. The accessible form may be optimized and/or configured to meet the needs of the user, and, for example, may allow a blind, deaf, color blind, or low vision user to have a better user experience than using the original user interface.

In embodiments, the present invention is exemplified in a hand-held portable electronic device, which may include a camera and/or which may make use of images obtained by a remote camera. The hand-held device may correspond, for example to a tablet computer or a smartphone type device and, in some embodiments, may be a tablet computer or a smartphone performing methods of various aspects described herein.

In addition to providing a better user experience for users having disabilities, embodiments described herein also allow users that do not speak or read a language of a user interface to be presented with a translated user interface that they may more easily understand. In this way, even consumer electronic devices that do not include accessibility features or alternative language interfaces may be used by a user having a disability or a language barrier.

Additionally, various embodiments described herein may also provide additional information to a user beyond what is included in the user interface, which may be referred to herein as contextual information. Examples of contextual information may be an identity of a character shown in a video program, or a speaker in an audio program or audio portion of a video program. Additionally, text and audio analysis may allow some embodiments to identify content of a video or audio program and obtain additional information related to the content and present the additional information to a user. Optionally, the additional information may be presented in an accessible format to facilitate presenting to a user having a disability.

Figure 1:
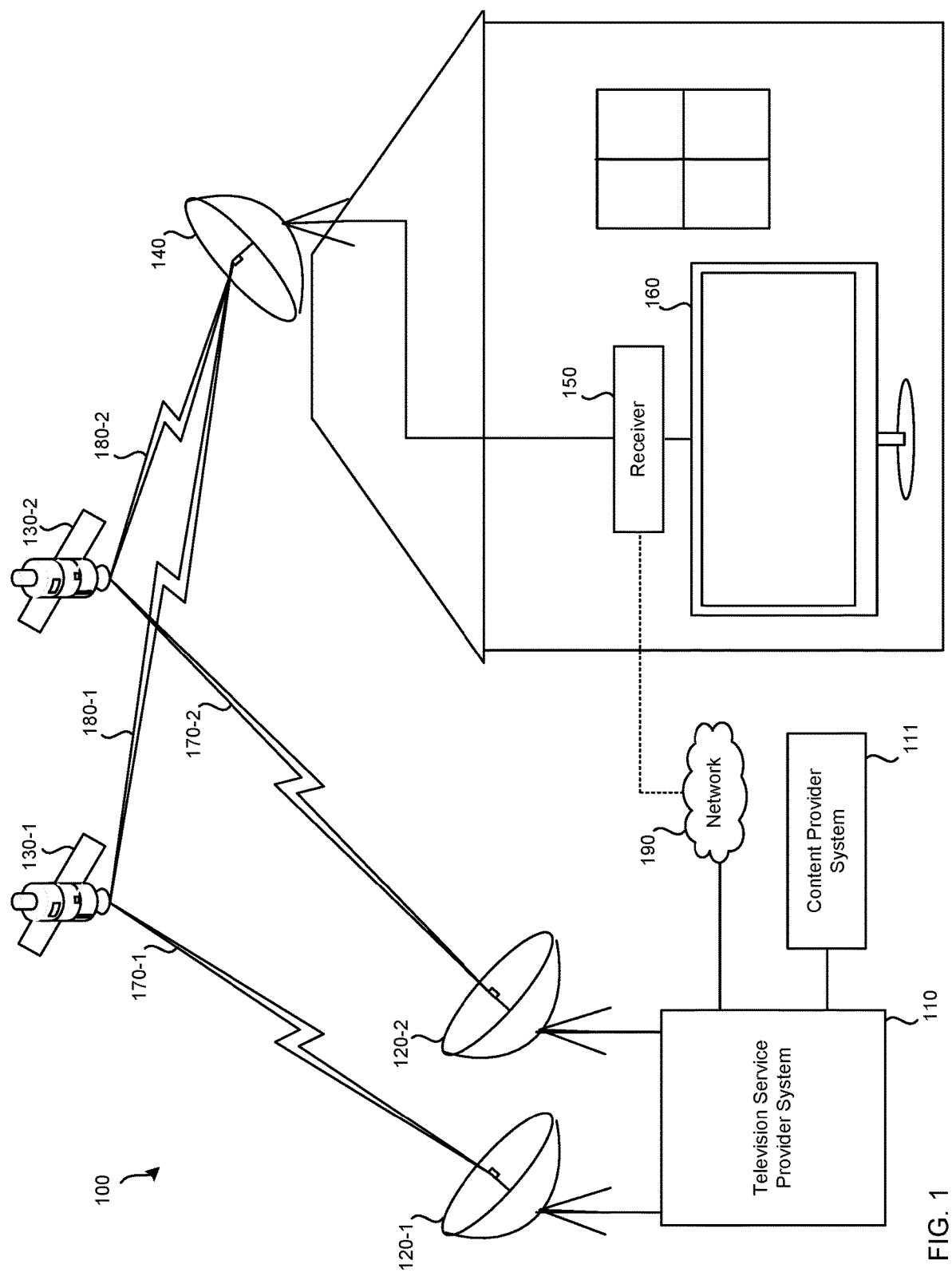
FIG. 1 illustrates an example of a satellite television distribution system.

FIG. 1 illustrates an embodiment of a satellite television distribution system 100. Satellite television distribution system 100 may include: television service provider system 110, satellite transmitter equipment 120-1 and 120-2 (collectively, satellite transmitter equipment 120), satellites 130-1 and 130-2 (collectively, satellites 130), satellite dish 140, receiver 150, and television 160. Alternate embodiments of satellite television distribution system 100 may include fewer or greater numbers of components. While only one satellite dish 140, receiver 150, and television 160 (collectively referred to as "user equipment") are illustrated, it will be appreciated that multiple (e.g., tens, thousands, millions) instances of user equipment may receive television signals from satellites 130. For example, a particular person may have user equipment at multiple homes or other locations.

FIG. 1 illustrates an example of a satellite-based television channel distribution system. It should be understood that at least some of the aspects of the satellite-based television channel distribution system may be similar to a cable television distribution system. For example, in a cable television system, rather than using satellite transponders, multiple RF channels on a coaxial cable may be used to transmit streams of television channels. Alternatively or additionally, digital data may be transmitted across fiber optic cables or other network links. As such, aspects detailed herein may be applicable to cable television distribution systems or other network-based distribution systems. Other forms of television distribution networks include broadcast over-the-air systems and IP-based or over-the-top distribution systems.

Television service provider system 110 and satellite transmitter equipment 120 may be operated by a television service provider. A television service provider may distribute television channels, on-demand programming, programming information, and/or other services to viewers. Television service provider system 110 may receive feeds of one or more television channels from various sources, such as content provider system 111. Content provider system 111 may provide television programs, advertisements, and other forms of content. For example, content provider system 111 may be a television network, such as ESPN®. To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. Such satellite feeds may be unidirectional—user equipment may not be able to transmit information back to television service provider system 110 via satellites 130. While a single television service provider system 110 and two satellite transmitter equipment 120 are illustrated as part of satellite television distribution system 100, it should be understood that multiple instances of transmitter equipment may be used, possibly scattered geographically to communicate with satellites 130. Such multiple instances of satellite transmitting equipment may communicate with the same or with different satellites. Different television channels and content may be transmitted to satellites 130 from different instances of transmitting equipment. For instance, a different satellite dish of transmitting equipment 120 may be used for communication with satellites in different orbital slots.

Satellites 130 may be configured to receive signals, such as streams of television channels, from one or more satellite uplinks, such as from satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170-1 and 170-2 (collectively, uplink signals 170) from downlink signals 180-1 and 180-2 (collectively, downlink signals 180). Satellites 130 may be in geosynchronous orbit. Each satellite 130 may be in a different orbital slot, such that the signal path between each satellite, uplink stations, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130-1. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite uplink 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of receiver 150 and/or satellite dish 140, it may only be possible to capture transponder streams from a limited number of transponders concurrently. For example, a tuner of receiver 150 may only be able to tune to a single transponder stream from a transponder of a single satellite at a time.

Figure 9:
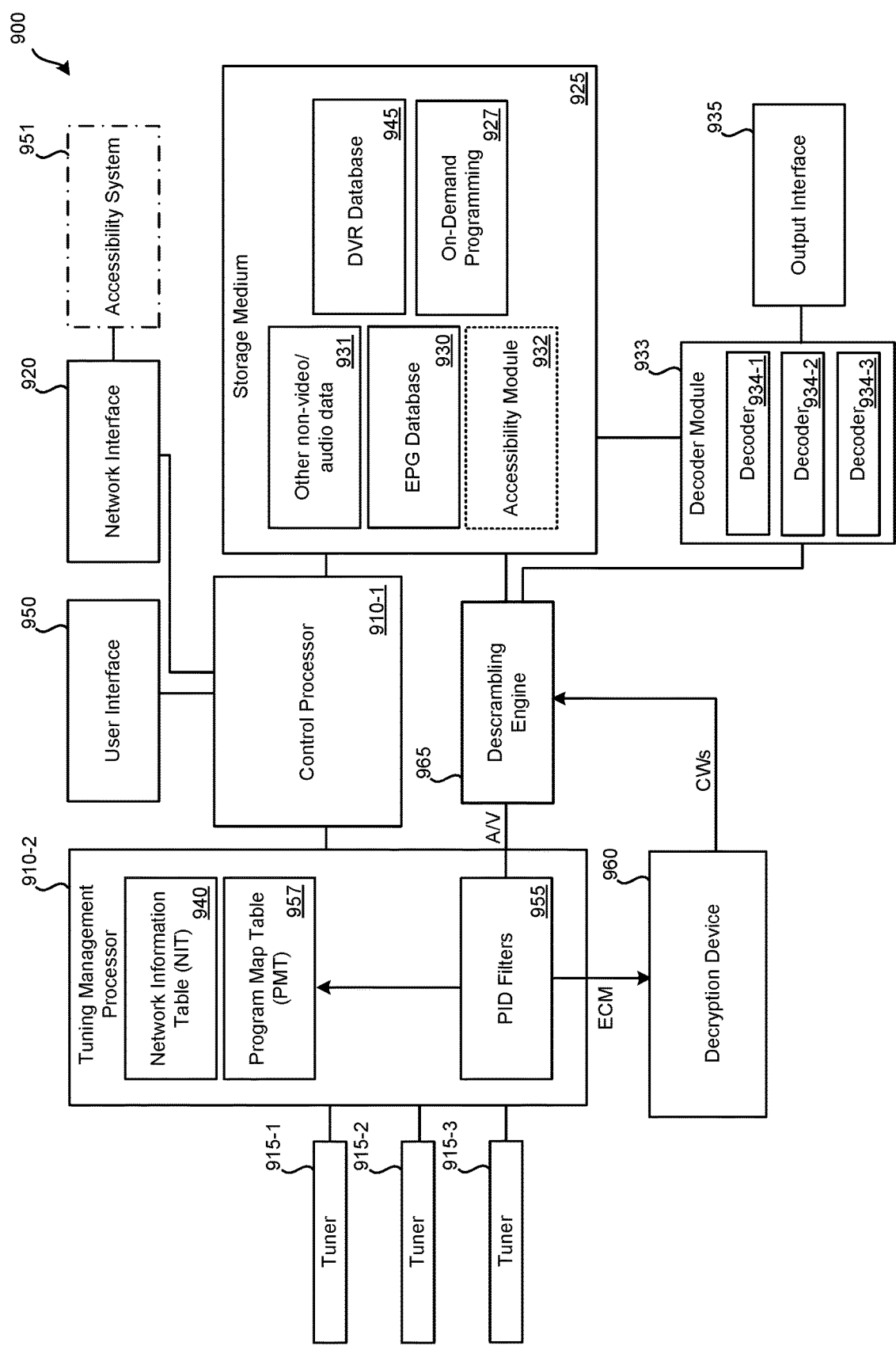
FIG. 9 provides a block diagram illustration of a receiver incorporating accessibility features, in accordance with some embodiments.

In communication with satellite dish 140, may be one or more sets of receiving equipment. Receiving equipment may be configured to decode signals received from satellites 130 via satellite dish 140 for display on a display or presentation device, such as television 160. Receiving equipment may be incorporated as part of a television or may be part of a separate device, commonly referred to as a set-top box (STB). Receiving equipment may include a satellite tuner configured to receive television channels via a satellite. In FIG. 1, receiving equipment is present in the form of receiver 150, which may be a STB. Alternatively, receiver 150 may be integrated directly into television 160. Optionally, receiver 150 may correspond to an over-the-air receiver, an over-the-top receiver, or other system for receiving television or video programming. Optionally, such receivers may provide electronic program guide information and/or user interfaces that present information to a user. Receiver 150 may thus decode signals and provide an output to television 160. FIG. 9 provides additional detail of receiving equipment.

Television 160 may be used to present video and/or audio decoded by receiver 150. Receiver 150 may also output a display of one or more interfaces to television 160, such as an electronic programming guide (EPG). In some embodiments, a display device other than a television may be used.

Uplink signal 170-1 represents a signal between satellite uplink 120-1 and satellite 130-1. Uplink signal 170-2 represents a signal between satellite uplink 120-2 and satellite 130-2. Each of uplink signals 170 may contain streams of one or more different television channels. For example, uplink signal 170-1 may contain a certain group of television channels, while uplink signal 170-2 contains a different grouping of television channels. Each of these television channels may be scrambled such that unauthorized persons are prevented from accessing the television channels.

Transponder stream 180-1 represents a signal between satellite 130-1 and satellite dish 140. Transponder stream 180-2 represents a signal path between satellite 130-2 and satellite dish 140. Each of transponder streams 180 may contain one or more different television channels in the form of transponder streams, which may be at least partially scrambled. For example, transponder stream 180-1 may include a first transponder stream containing a first group of television channels, while transponder stream 180-2 may include a second transponder stream containing a different group of television channels. A satellite may transmit multiple transponder streams to user equipment. For example, a typical satellite may relay 32 transponder streams via corresponding transponders to user equipment. Further, spot beams are possible. For example, a satellite may be able to transmit a transponder stream to a particular geographic region (e.g., to distribute local television channels to the relevant market). Different television channels may be transmitted using the same frequency of the transponder stream to a different geographic region.

FIG. 1 illustrates transponder stream 180-1 and transponder stream 180-2 being received by satellite dish 140. For a first group of television channels, satellite dish 140 may receive a transponder stream of transponder stream 180-1; for a second group of channels, a transponder stream of transponder stream 180-2 may be received. Receiver 150 may decode the received transponder stream. As such, depending on which television channel(s) are desired, a transponder stream from a different satellite (or a different transponder of the same satellite) may be accessed and decoded by receiver 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and receiver 150. Via such a secondary communication channel, bidirectional exchange of data may occur. As such, data may be transmitted to television service provider system 110 via network 190. The connection between network 190 and receiver 150 is illustrated as dotted since this connection allowing communications from receiver 150 to be sent to television service provider system 110 may not be available (e.g., receiver 150 may not have such communication capabilities, receiver 150 may have such capabilities but may not be connected with network 190). For example, even if a receiver is capable of communicating using network 190, communication using network 190 may require that the user has an active account with an internet service provider. Accordingly, some receivers may only be able to receive data from satellites 130 via receiving equipment, such as satellite dish 140. In other situations, while a user may have an active ISP account, such as via a fiber, cable, or DSL internet connection, equipment failure may occur. For instance, a router through which receiver 150 connects to network 190 may fail or be in need of resetting. Network 190 may be or include the Internet.

Figure 2:
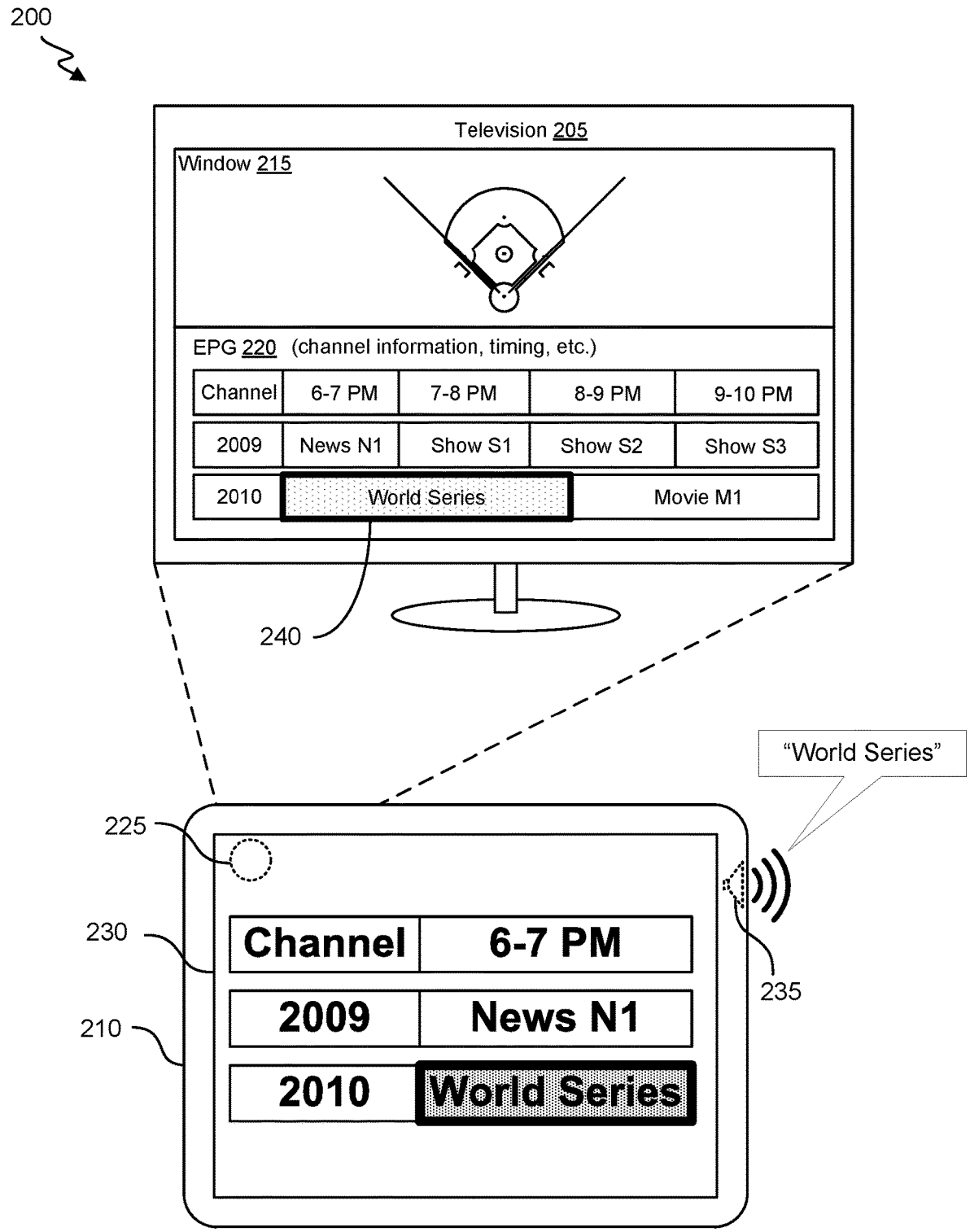
FIG. 2 illustrates an example of a consumer electronic device and an accessibility system, in accordance with some embodiments.

FIG. 2 illustrates an example environment 200 including a television 205 and an accessibility system 210. Television 205 depicts a user interface including a window 215 and an electronic program guide (EPG) 220. Window 215 may provide a live feed of video programming, for example, received from a television service provider, and EPG 210 may provide channel information, timing information, program information, and the like to facilitate user interaction with the television service, such as to allow a user to plan for program viewing. As an example, EPG 220 includes interface elements corresponding to various channels, time slots, programs, etc. The interface element "World Series" is indicated with shading and a highlighted border to indicate that this element is focused by the user interface. In some embodiments, if the television 205 or other device generating the user interface displayed on television 205 receives input corresponding to a selection, this may in turn select, activate, or otherwise advance the user interface on the element having focus 240. Here, selection of the interface element "World Series" having focus 240 may activate for immediate presentation, such as in window 215, the television programming corresponding to the World Series. Other configurations are possible, such as activation of a recording of the World Series programming, obtaining information about the programming, etc. It will be appreciated that input may be provided by conventional input devices, such as an infrared or radio frequency remote control, to allow for some aspect of user interaction. Primarily, transmission of information from the television 205 to the user may be by way of an audio or video output.

It will be appreciated that some users may be incapable or have difficulties interacting with television 205 and EPG 220. For example, users that have vision difficulties, such as blind users, color blind users, or low-vision users, may not be able to easily interact with television 205 and EPG 220 using the video output and a remote control, since they may not be able to perceive buttons on the remote or elements displayed on the display. Unfortunately, not all consumer electronics devices include features allowing access by users many different abilities. The present disclosure provides solutions for the interaction, such as by way of an accessibility system 210.

As depicted, accessibility system 210 comprises a handheld device, similar to a tablet computer or smartphone. In some embodiments, accessibility system 210 comprises a tablet computer or smartphone incorporating aspects described herein into a software program running on the tablet computer or smartphone. Accessibility system 210 includes a digital camera 225, for example positioned on the back of accessibility system, such that it can obtain images of user interfaces, such as displayed on television 205.

Accessibility system 210 also includes a display 230, which may correspond to a touch sensitive display. Inclusion of a touch sensitive display may be useful for receiving input from a user, such as input corresponding to selection of an interface element. In embodiments, accessibility system may transmit commands to a consumer electronic device generating the display being imaged by the camera 225 of accessibility system 210.

In FIG. 2, accessibility system 210 also includes a speaker 235, to provide a mechanism for audio output. Other features may be included in accessibility system, including an audio output port (e.g., a headphone jack), a video output port (e.g., an HDMI port), a general input/output port (e.g., USB port), etc. to facilitate presentation of information to a user.

Processing capabilities included in accessibility system 210 allow it to perform image processing to identify interface elements presented in the user interface imaged by digital camera 225. In embodiments, image processing may be useful for identifying one or more interface elements. Accessibility system 210 may then analyze the interface elements and generate accessible interface elements using the identified and/or analyzed interface elements.

In embodiments, one or more images of the user interface may be analyzed to identify interface elements having focus. For example, as illustrated in FIG. 2, the EPG 220 may be imaged by digital camera 225 and the image(s) so obtained may be analyzed to identify one or more interface elements, including one or more interface elements having focus and one or more interface elements lacking focus. Focus may be identified, for example, by obtaining multiple images and comparing the images to identify differences. Here, the black border and shading may, for example, change, move, flash, etc., and so accessibility system 220 may be able to detect these changes and identify focus.

As depicted in FIG. 2, the accessibility system 210 may output on display 230 the accessible interface elements, which may correspond to magnified or larger text font size versions of at least a portion of the interface elements output by the television 205. As another example, audio may be output by the speaker 235 as an audio accessibility element. Here, the accessible interface element corresponding to an audio version of the words "World Series" is output as audio via speaker 235. The larger or magnified text and the audio output may allow a partially blind or low vision user to perceive the information presented in the EPG 220. As focus is moved through user interaction (e.g., via a remote control), the display 230 may be updated to match the focus. Additionally or alternatively, as focus is moved through user interaction, audio output by speaker 235 may correspond to the item selected by the focus.

Figure 3:
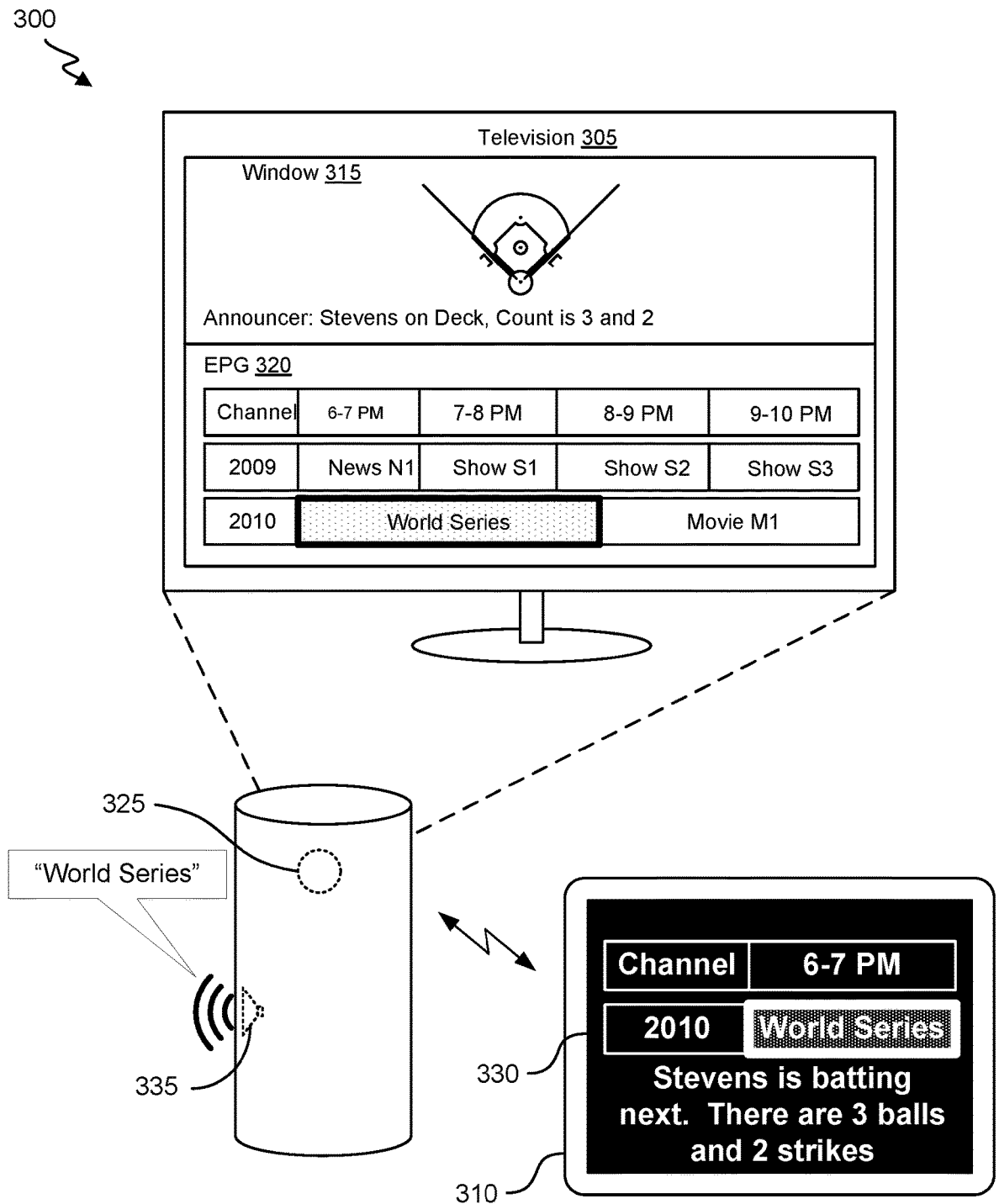
FIG. 3 illustrates an example of a consumer electronic device and an accessibility system, in accordance with some embodiments.

It will be appreciated that, although accessibility system 215 includes digital camera 225 and speaker 235, embodiments are contemplated where these elements are positioned external to accessibility system 215. For example, FIG. 3 depicts an example environment including a television 305, an accessibility system 310, and a camera device 325 that is separate and/or distinct from accessibility system 310. Use of a separate camera 325 may be advantageous as camera 325 may be positioned in stationary manner such that it is always directed at television 305. It will be appreciated that multiple cameras may be used with the systems and methods disclosed herein, such as a first camera included in an accessibility system and a second camera separate from the accessibility system.

Television 305 is again displaying a window 315, which may include video programming, and an EPG 320. In window 315, text may be displayed. For example, text may be presented as part of the video programming. Optionally, text may be presented such as in a closed captioning feed. Here, the text "Announcer: Stevens on Deck, count is 3 and 2" is displayed in window 315.

Camera 325 may image television 305 and provide the image to accessibility system 310 for analysis. Optionally, the camera 325 or a device including the camera 325 may include processing capabilities to perform image analysis. Upon analysis, one or more interface elements present in the display on television 305 may be identified. These interface elements may be used to generate accessible interface elements to allow for output by accessibility system 310. For example, the accessible interface elements may correspond to an alternatively colored version of the interface elements to allow for a color blind or low vision user to more easily view the information provided therewith.

Additionally or alternatively, the camera 325 or an external device including camera 325 may also include a speaker 335 to allow for output of the accessible interface element. In FIG. 3, the speaker 335 is outputting audio corresponding to a spoken version of the words "World Series", which may correlate with the interface item identified by system 310 as having focus. Other implementations are possible, including where the audio output corresponds to elements not having focus or elements identified by a user, such as by way of input corresponding to selection of an interface element.

In addition to a change in color or size of font or audio output as accessible interface elements, a change in font texture is also contemplated, which may allow particular users to more easily view and/or read the text.

Additionally or alternatively, various language versions of interface elements may correspond to an accessible interface element. For example, if a user interface presented by television 305 included text or audio in a first language, an accessible interface element may correspond to a translated or alternative language version of the text or audio. Processing capabilities on the accessibility system 310 may obtain and/or generate a translation of the text or audio for use in generating the accessible interface elements.

In one embodiment, an accessible interface element corresponding to an alternative language version of an interface element may correspond to a simplified language version, which may include more easily understandable terminology, but in the same or a foreign language. As an example, the text "Stevens on Deck, Count is 3 and 2" may be obtained by accessibility and used to generate a simplified language version of the text for output by the display 330, such as "Stevens is batting next. There are 3 balls and 2 strikes." Such generation of accessible interface elements including simplified or translated language may benefit users who are unable to understand the language presented in an interface element.

Aside from a television, set-top-box, or receiver, aspects of the invention are useful for making previous generation consumer electronic devices more accessible. It will be appreciated that many previous generation consumer electronic devices may not include accessibility features that may allow for easy control or interaction by users, such as users having disability, learning, language, or other barriers preventing use of the interface of the previous generation consumer electronic devices. Example consumer electronic devices include, but are not limited to a TV, a television receiver, a set top box, an over-the-air receiver, an over-the-top receiver, a VCR, a DVR, a DVD player, a Blu-ray player, a Laserdisc player, a video game console, an audio receiver, an HVAC system, a security system, and a home automation system.

Figure 4:
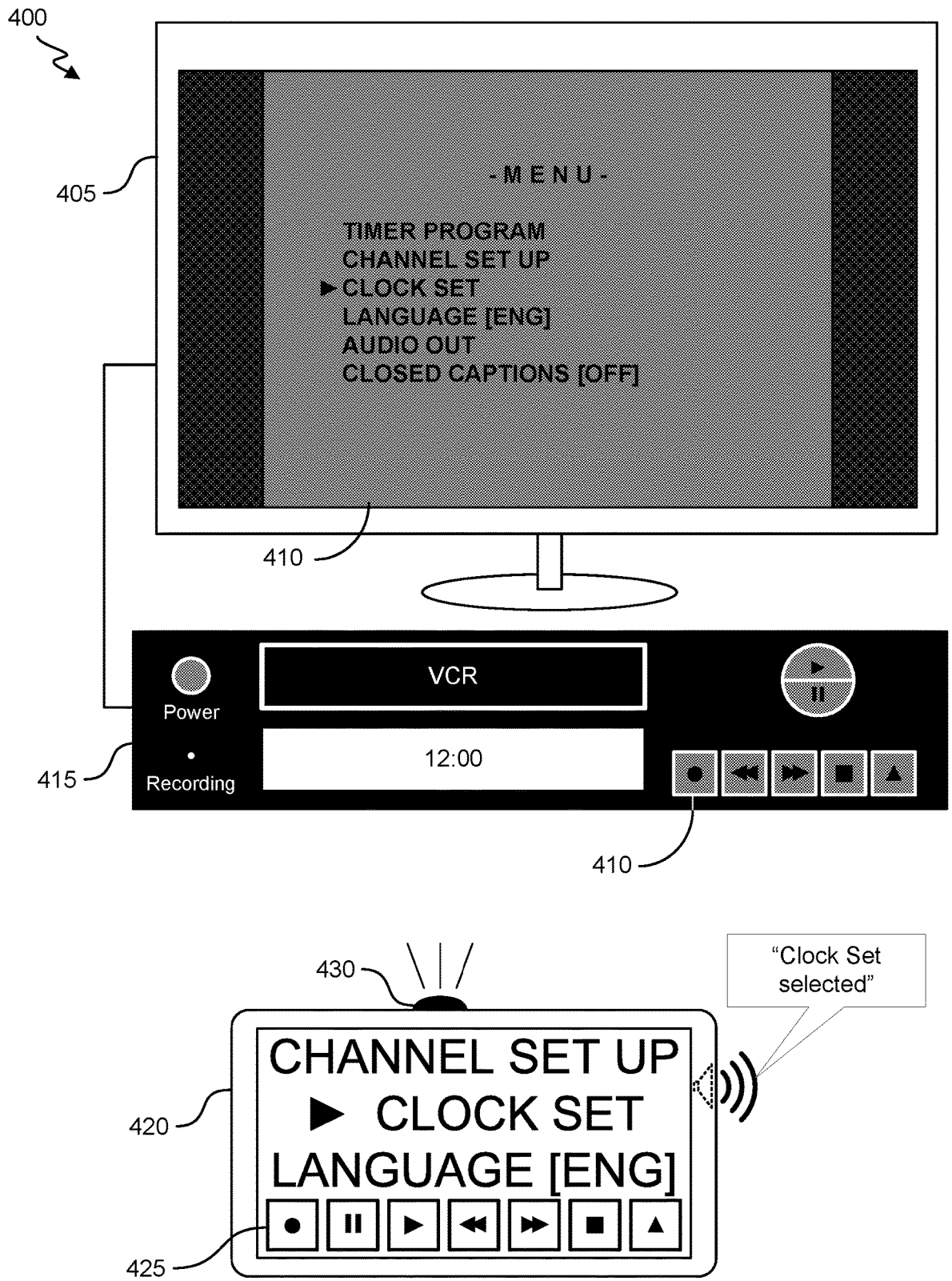
FIG. 4 illustrates an example of a consumer electronic device and an accessibility system, in accordance with some embodiments.

FIG. 4 depicts an environment 400 in which a television 405 is displaying a user interface 410 of a VCR 415, which may not include accessibility features or which may only include limited accessibility features, such as alternative languages or closed captioning, etc. Accessibility system 420 provides for output of accessible interface elements corresponding to the user interface 410 of VCR 415, such as by imaging the display of television 405, identifying interface elements of the user interface 410, generating accessible interface elements and outputting the accessible interface elements. As illustrated, accessibility system 420 may display large font size versions of the interface elements included in user interface 410 or may output audio corresponding to the accessible interface elements. Other types and configurations of accessible interface elements are contemplated, as described throughout the present description, such as alternative color, alternative font characteristics, translated or alternative language versions, etc.

In various embodiments, accessibility systems may generate and output accessible interface elements corresponding to control inputs on a consumer electronic device. Here, accessibility system 420 generates and displays accessible interface elements 425 corresponding to at least a subset of the various user inputs available on VCR 415. For example, interface elements 425 include controls for recording, pausing, playing, rewinding, fast forwarding, stopping, and ejecting. These interface elements 425 may correspond directly to one or more physical interface elements 435, which may be buttons, etc. Accessibility system 420 may include an infrared transmitter 430 or other transmission device for transmitting control commands to the VCR 415.

Figure 5:
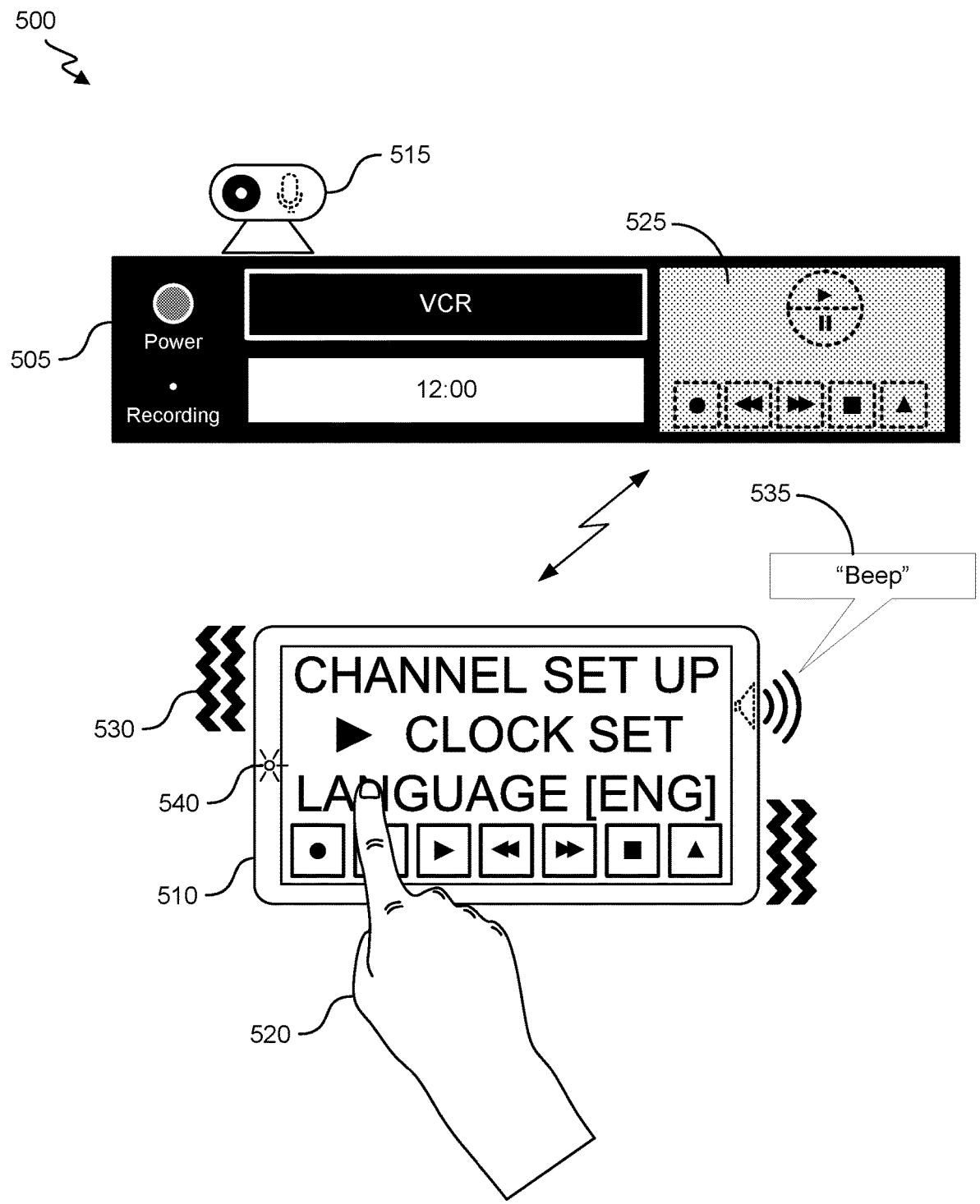
FIG. 5 illustrates an example of a consumer electronic device and an accessibility system, in accordance with some embodiments.

FIG. 5 provides a schematic illustration of an environment 500 including a VCR 505 and an accessibility system 510. For simplicity of illustration, a display device, such as a television is not depicted in FIG. 5, but it will be appreciated that a camera (also not shown) may be used to obtain images of a user interface of VCR 505 that is presented on the display device, so that accessibility system 510 may use the obtained images to generate accessible interface elements.

Here, inputs may be provided and used to control VCR 505. Optionally, a touch sensitive interface included in accessibility system 510 may be used to obtain user input. For simplicity of the description, inputs will be described with reference to FIG. 5 by way of the touch sensitive interface, but it will be appreciated that other input methods may be utilized. For example, gesture or vocal command based inputs may be provided, such as by way of gesture and audio input device 515, which may provide detected commands to accessibility device 510 using a wired or wireless connection.

A user 520 may generate inputs corresponding to selection of an accessible interface element displayed by accessibility system 510. For example, user 520 may wish to change a language setting of VCR 505 and so may indicate this by touching that portion of the display, for example. Other configurations are possible, including navigation of the user interface of VCR 505 using the other accessible interface elements (e.g., record, pause, play, rewind, fast forward, stop, eject, etc.) that may correspond more directly with the manual control of VCR 505 using physical inputs located on the VCR 505.

In contrast to FIG. 4, in some embodiments, accessibility system 510 may not be able to provide remote commands directly to VCR 505, such as by way of an infrared or radio frequency transmission. Optionally, a physical input device may be used to actuate buttons on a consumer electronic device so as to control the consumer electronic device by way of an accessibility system. For example, FIG. 5 shows a physical input actuator 525 which may include, for example, one or more solenoids or other actuators for physically depressing buttons on VCR 505. For example, to activate the language select interface element after receiving input from user 520 on touch sensitive interface of accessibility system 510, accessibility system 510 may transmit (over a wired or wireless connection) one or more commands to actuator 525, and, following receipt, actuator 525 may actuate one or more of the physical buttons on VCR 505, such as a fast forward button in order to move focus to the language selection interface element followed by actuation of the play button to activate selection of the language selection interface element. Other implementations are possible.

In some embodiments, an accessibility system may generate one or more feedback outputs to confirm receipt of user input and/or to confirm transmission to the consumer electronic device. In FIG. 5, various feedback outputs are depicted, including a tactile feedback output 530 (e.g., a vibration), an audio feedback output 535 (e.g., a "beep" or other audible notification), and optical feedback output 540 (e.g., activation of a light emitting diode).

Figure 6:
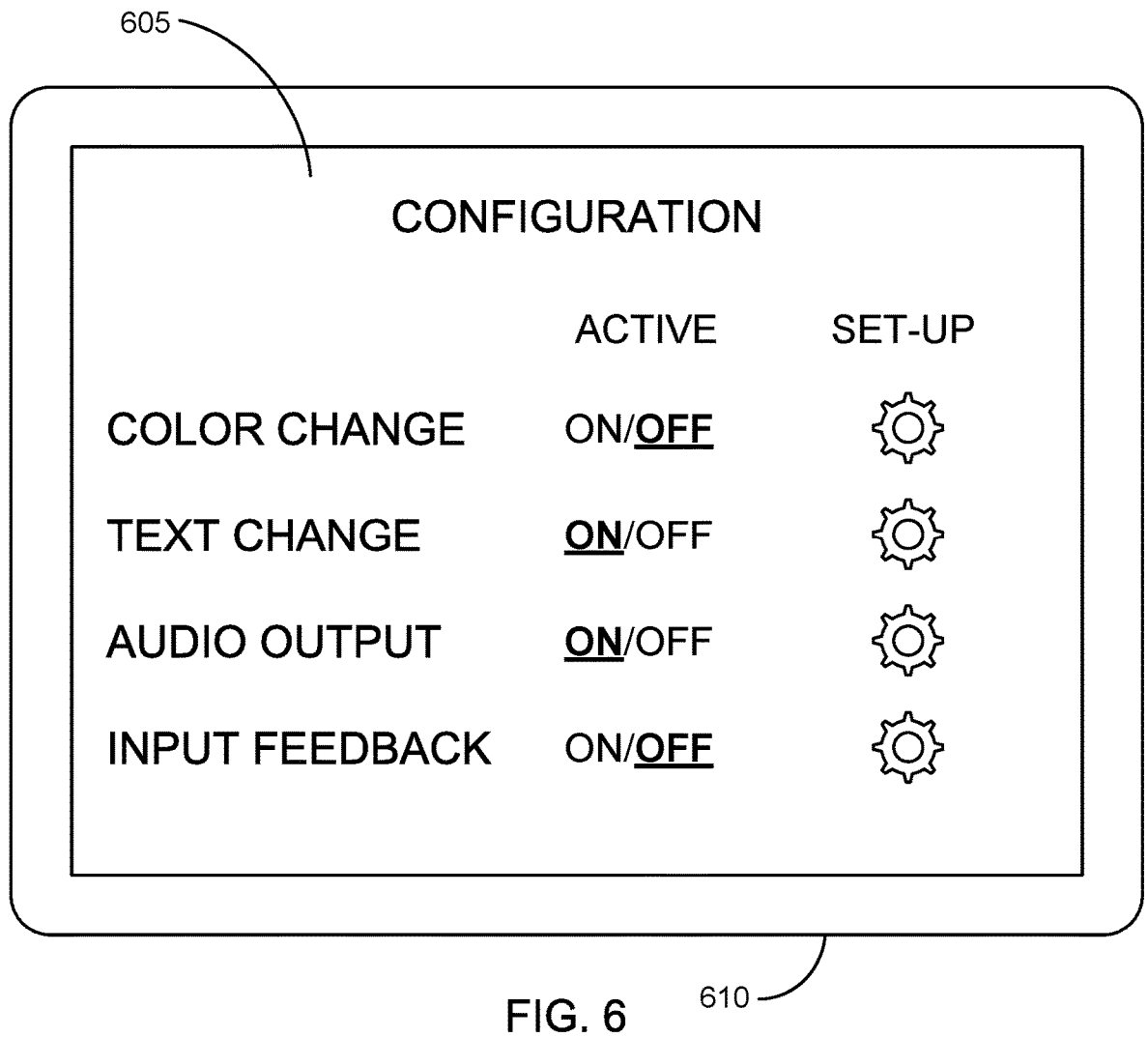
FIG. 6, illustrates an example of a configuration interface of an accessibility system, in accordance with some embodiments.

In various embodiments, an accessibility system may be configurable such that a user may activate various types of accessible interface elements in order to best suit their needs. FIG. 6 provides a schematic illustration of a configuration interface 605 of an accessibility system 610. The configuration interface 605 may allow for activation or deactivation of various features of the accessibility system 610. Additionally the configuration interface 605 may allow for configuration or setup of the various features of the accessibility system. Selection of the activation or deactivation may, for example, activate a flag stored in memory associated with the accessibility system 610 so that the accessibility system may output only accessible interface elements corresponding to the activated features. The accessibility system 610 may also store the preferences associated with each of the types of accessibility features.

As a first example, a color change for accessible interface elements may be activated and/or configured. The color change feature may allow for the accessible interface element to be, for example, a different color from the interface element presented in the user interface. For example, contrasting colors may be selected so as to allow a low-vision user to more easily perceive the accessible interface elements. As another example, colors may be selected so as to allow a color blind user to more easily perceive the accessible interface element.

As a second example, a text change for accessible interface elements may be activated and/or configured. The text change feature may allow for the accessible interface element to have a different font size, different font style, or different font texture, for example, from the interface element presented in the user interface. For example, a large font size may be selected so as to allow a low-vision user to more easily perceive the accessible interface elements.

Figure 7:
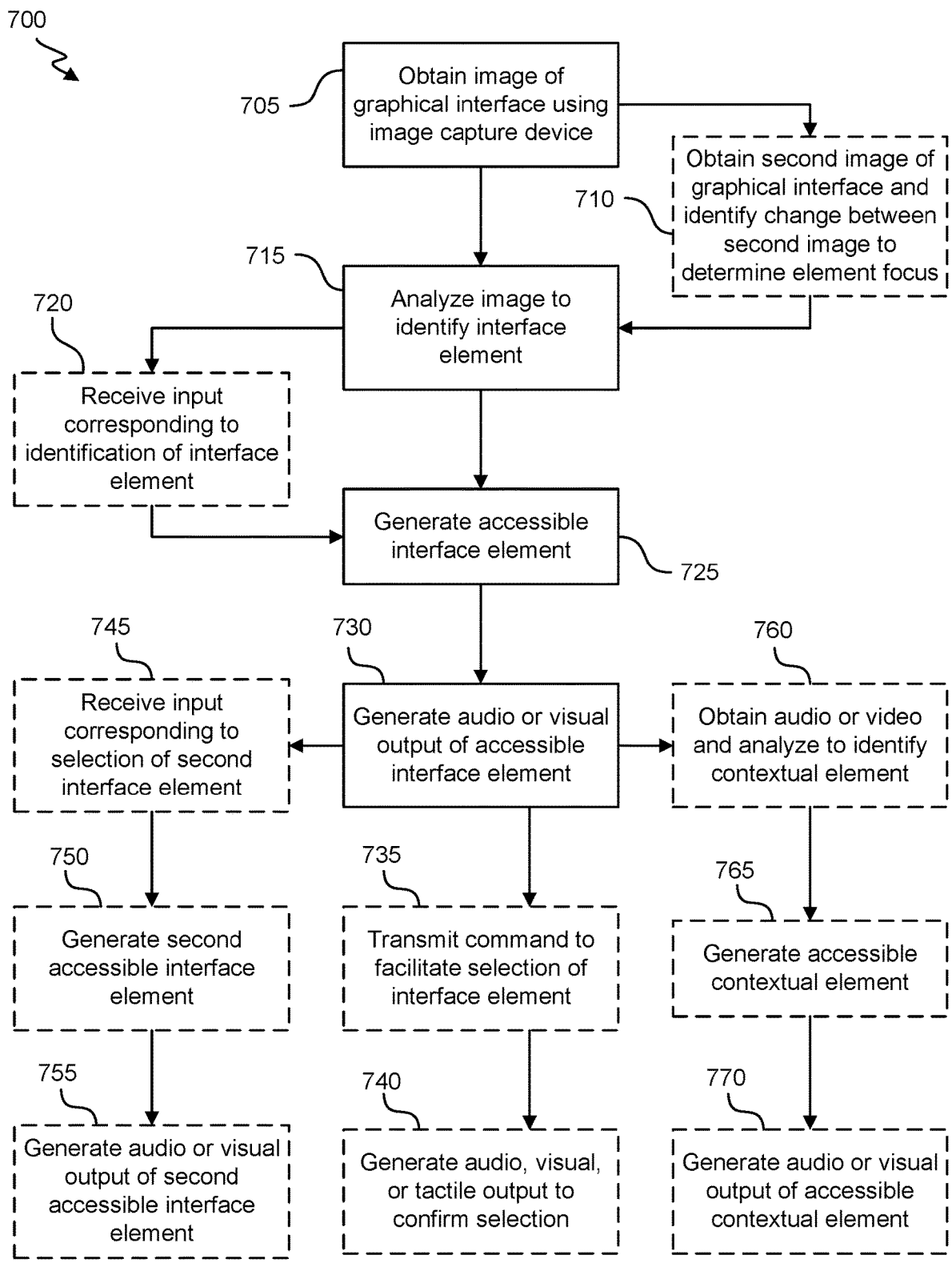
FIG. 7 provides an overview of a method for generating accessible interface elements, in accordance with some embodiments.

FIG. 7 provides an overview of a method embodiment 700 for generating and outputting accessible interface elements. At block 705, the method includes obtaining an image of a graphical interface using an image capture device. As described above, a camera integrated into an accessibility system may be used, but a standalone camera or a camera integrated into another device may also be used. Optionally, at block 710, a second image of the graphical interface element may be obtained and used to identify a change from the image to identify or determine element focus in the user interface.

At block 715, the image(s) is/are analyzed to identify one or more interface elements. For example, image processing techniques may be used, such as optical character recognition, shape recognition, etc., to identify the interface elements. Optionally, at block 720, input may be received, such as by way of a touch sensitive, position sensitive, or gesture-based input device, to allow for user selection or identification of an interface element.

At block 725, an accessible interface element may be generated. Generation of an accessible interface element may correspond to receiving the accessible interface element. Optionally, generation of the accessible interface element may correspond to using the interface element identified at block 715 or 720 along with user preferences to generate the accessible interface element. For example, user preferences may correspond to activation or selection of particular types of accessible interface elements, such as to accommodate a low-vision user, a blind user, a deaf user, a color blind user, or any combination of these.

At block 730, the accessible interface element is output, such as by way of an audio or visual output. In embodiments, the accessible interface element may be different from the interface element. For example, the accessible interface element may have a different font size, style, color, texture, than the interface element. Optionally, the accessible interface element may correspond to a different type of presentation than the interface element, such as where the interface element is a text element and the accessible interface element is an audio output.

Optionally, at block 745 an input may be received corresponding to selection of a second interface element. At block 750 a second accessible interface element may be generated. At block 755 an audio or visual output of the second accessible interface element may be generated. Optionally, the second accessible interface element may be of a different type than the accessible interface element generated at block 725. In this way, multiple and different types of accessible interface elements may be generated and output, optionally simultaneously. For example, accessible interface elements corresponding to either or both focused interface elements and non-focused interface elements may be generated and output.

At block 760, audio and/or video may be obtained, such as by way of an audio capture device (e.g., a microphone) and/or a video capture device (e.g., a camera). The captured audio and/or video may be analyzed to identify one or more contextual elements. For example, voice or audio recognition techniques may be applied to captured audio to identify a contextual element. Alternatively or additionally, image, character, or facial recognition techniques may be applied to captured video to identify a contextual element.

Contextual elements may correspond, for example, to an identity of a character shown in a video frame, or text depicted in a video frame, or spoken language in an audio segment. Contextual elements contrast with interface elements in that interface elements correspond to user interface features of a consumer electronic device, while contextual elements may correspond to aspects of the content of audio or video being displayed or output by a consumer electronic device.

At block 765, an accessible contextual element is generated. For example, the contextual elements may be used to obtain information about the character shown in the video frame, the text depicted in the video frame, or the spoken language in the audio segment, and the information may be used to generate the accessible contextual element. For example, the information may be different than simply the content of the contextual element. As a specific example, the contextual element may correspond to an identity (i.e., a name) of an actor or character shown in a video segment. The information obtained may correspond to information about the actor, such as biographical information other information about the actor beyond the actor's name. It will be appreciated that a variety of sources for the information may exist, such as a network or Internet source or a local database contained within the accessibility system that may be optionally updated periodically or aperiodically. Example sources may correspond to the Internet Movie Database (IMDb), Wikipedia, and the like. As another specific example of a contextual element, the contextual element may correspond to text shown in the video segment, and the information may correspond to a translation of the information, an alternative language version of the information, or other information about the text, such as an author or a meaning of the text, beyond the text itself.

The contextual accessible element may directly include the obtained information, and the contextual accessible element may be associated with one or more types of accessible elements, such as an alternative color or font character version. At block 770, an audio or visual output of the accessible contextual element may be output. It will be appreciated that an accessible contextual element may facilitate presentation of the information to a user, such as users having disability, learning, language, or other barriers preventing the user from directly obtaining the information from the audio or video.

Figure 8:
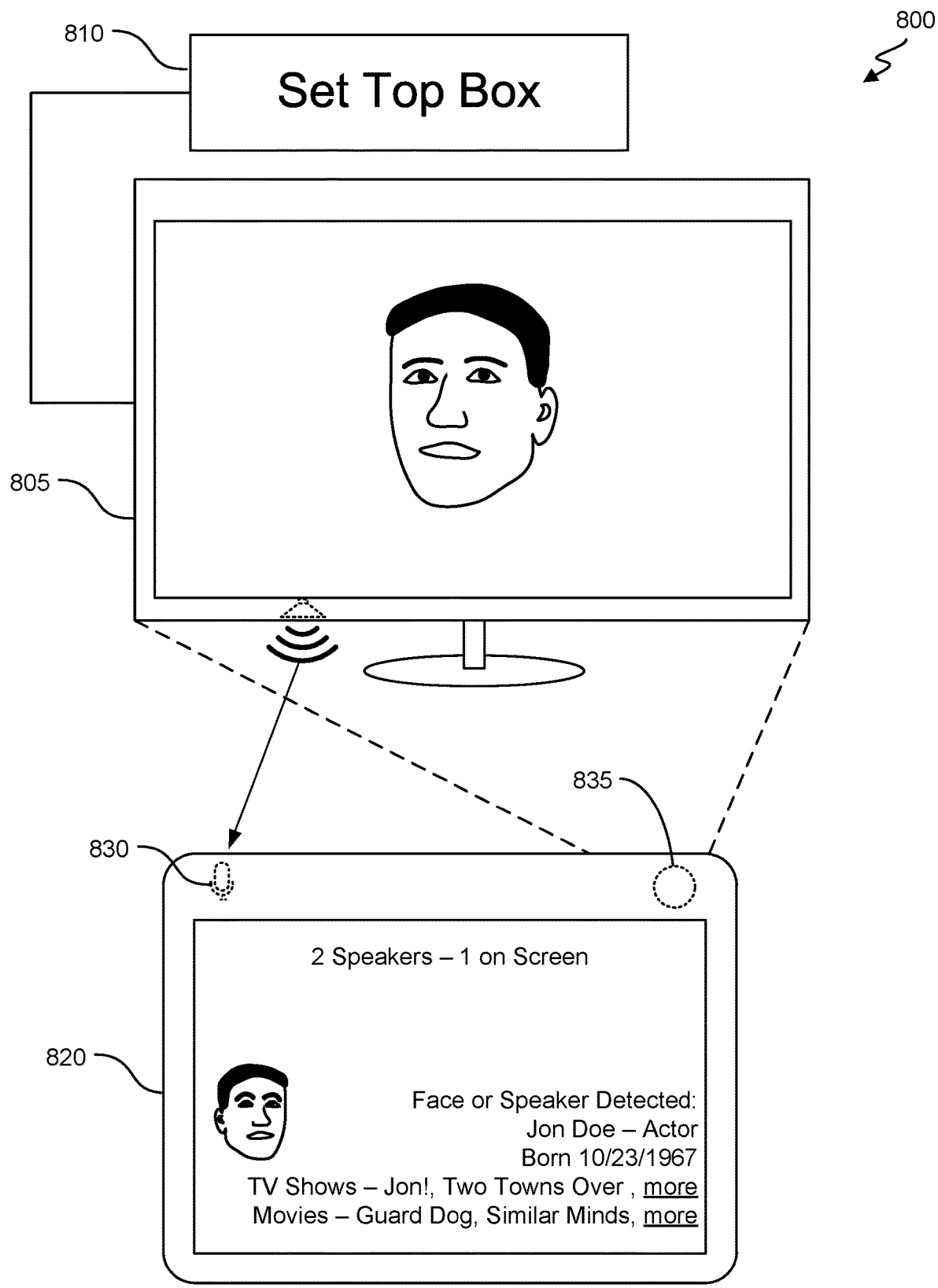
FIG. 8 illustrates an embodiment of a consumer electronic device and an accessibility system, in accordance with some embodiments.

FIG. 8 illustrates an environment 800 including a television 805, a set-top box 810, such as a receiver, and an accessibility system 820. In FIG. 8, accessibility system 820 obtains audio output by a speaker 825 of television 805, such as by using microphone 830 included in accessibility system 820. Accessibility system 820 also obtains one or more images or video captures of video output by television 805, such as by using camera 835.

Accessibility system 820 may perform analysis of the audio obtained by microphone 830 to identify one or more contextual elements. For example, the audio may be analyzed using voice recognition, or text-to-speech techniques to identify a contextual element. As an example, the audio received by microphone 830 may be analyzed to identify a number of speakers in the audio and/or an identity of the speakers. Alternatively or additionally, the audio may be analyzed to determine the content of the audio (i.e., the spoken words in the audio, actions corresponding to the audio, or sources of the audio). Optionally, the contextual element may correspond to a spoken language and the accessible contextual element may correspond to a text version of the spoken language, a simplified language version of the spoken language, or a translated language version of the spoken language. Optionally, the contextual element may correspond to a continuous flow of information, such as spoken language or text, which is converted to an accessible contextual element on the fly such that the accessible contextual element also corresponds to a continuous flow of information.

The information so identified from the audio may be used to generate an accessible contextual element to be output. As illustrated in FIG. 8, the contextual information obtained may correspond to a number of the speakers and this information may be output as a contextual element by accessibility system 820. In FIG. 8, this corresponds to the text "2 Speakers" depicted on the display of accessibility system 820. Additionally or alternatively, contextual analysis may be used to obtain information about the speaker or content and this additional information may be presented as a contextual element.

Accessibility system 820 may perform analysis of the video obtained by camera 835 to identify one or more contextual elements. For example, the video may be analyzed using facial recognition, optical character recognition, shape recognition, etc., to identify a contextual element. As an example, the video received by camera 835 may be analyzed to identify a number and/or identity of characters depicted in the video. Alternatively or additionally, the video may be analyzed to determine the content of the video (i.e., text shown in the video, actions taking place in the video, a location of the video, etc.).

The information so identified from the video may be used to generate an accessible contextual element to be output. As illustrated in FIG. 8, the contextual information obtained may correspond to a number of the characters shown on screen and this information may be output as a contextual element by accessibility system 820. In FIG. 8, this corresponds to the text "1 on Screen" depicted on the display of accessibility system 820, indicating how many speakers are depicted on the screen at a particular instance. Additionally or alternatively, an identity of the character/actor or a location may be used to obtain additional information about the character/actor or location and this additional information may be presented as a contextual element.

As illustrated in FIG. 8, a face may be recognized in the analysis or a voice of a speaker may be recognized in the analysis and information about the speaker or face may be output as an accessible interface element. For example, in FIG. 8, the face or speaker detected is identified as the actor Jon Doe and additional information about the actor is obtained by accessibility system 820 and presented for display as an accessible interface element, such as the date of birth of the actor, and TV shows or movies the actor stars or starred. The additional information may also correspond to images and these images so obtained may be presented as an accessible contextual element by accessibility system 820. It will be appreciated that a variety of sources for the facial information may exist, such as a network or Internet source or a local database contained within the accessibility system that may be optionally updated periodically or aperiodically. Various embodiments may include image or facial recognition algorithms performed by an accessibility system. Optionally, images of faces may be transmitted to an external network service provider, such as a facial recognition provider to identify an identity of faces contained in the images.

FIG. 9 illustrates an embodiment of a receiver 900 that makes use of and/or interacts with an accessibility system. Embodiments of receiver 900 may include set top boxes (STBs), television receivers, and over-the-top receivers. As previously noted, in addition to being in the form of a STB, a receiver may be incorporated as part of another device, such as a television or other form of display device, such as a computer, smartphone, tablet, or other handheld portable electronic device. For example, a television may have an integrated receiver (which does not involve an external STB being coupled with the television).

Receiver 900 may represent receiver 150 of FIG. 1 and may be in the form of a STB that communicates with a display device such as a television. Receiver 900 may be incorporated as part of a television, such as display device 160 of FIG. 1 or television 200 of FIG. 2, etc. Receiver 900 may include: processors 910 (which may include control processor 910-1, tuning management processor 910-2, and possibly additional processors), tuners 915, network interface 920, non-transitory computer-readable storage medium 925, electronic programming guide (EPG) database 930, networking information table (NIT) 940, digital video recorder (DVR) database 945 (which may include provider-managed television programming storage and/or user-defined television programming), on-demand programming 927, accessibility module 932, commercial database 946, user interface 950, decryption device 960, decoder module 933, interface 935, and/or descrambling engine 965. In other embodiments of receiver 900, fewer or greater numbers of components may be present. It should be understood that the various components of receiver 900 may be implemented using hardware, firmware, software, and/or some combination thereof. Functionality of components may be combined; for example, functions of descrambling engine 965 may be performed by tuning management processor 910-2. Further, functionality of components may be spread among additional components; for example, PID filters 955 may be handled by separate hardware from program map table 957. Receiver 900 may be in data communication with accessibility system 951, such as by way of network interface 920.

Processors 910 may include those configured to perform processes such as tuning to a particular channel, accessing and displaying EPG information from EPG database 930, and/or receiving and processing input from a user. For example, processors 910 may include one or more processors dedicated to decoding video signals from a particular format, such as MPEG, for output and display on a television and for performing decryption, if required. It should be understood that the functions performed by various modules of FIG. 9 may be performed using one or more processors. As such, for example, functions of descrambling engine 965 may be performed by control processor 910-1.

Control processor 910-1 may communicate with tuning management processor 910-2. Control processor 910-1 may control the recording of television channels based on timers stored in DVR database 945. Control processor 910-1 may also provide commands to tuning management processor 910-2 when recording of a television channel is to cease. In addition to providing commands relating to the recording of television channels, control processor 910-1 may provide commands to tuning management processor 910-2 that indicate television channels to be output to decoder module 933 for output to a display device. Control processor 910-1 may also communicate with network interface 920 and user interface 950. Control processor 910-1 may handle incoming data from network interface 920, including network transport streams received from over-the-top service providers. Control processor 910-1 may handle incoming data from network interface 920, including network transport streams received from user interface 950, which may include user input received by way of one or more human interface devices. Additionally, control processor 910-1 may be configured to output data via network interface 920. Control processor 910 may also be configured to perform image and audio analysis, such as to identify contextual aspects present in an audio or video stream, for example facial recognition or voice recognition.

Tuners 915 may include one or more tuners used to tune to transponders that include broadcasts of one or more television channels that may be received from a satellite or cable system, for example. In the illustrated embodiment of receiver 900, three tuners are present (tuner 915-1, tuner 915-2, and tuner 915-3). In other embodiments, two or more than three tuners may be present, such as four, six, or eight tuners. Each tuner contained in tuners 915 may be capable of receiving and processing a single transponder stream from a satellite transponder at a given time, for example. As such, a single tuner may tune to a single transponder stream at a given time. If tuners 915 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 915 may be used to receive the signal containing the multiple television channels for presentation and/or recording. Tuners 915 may receive commands from tuning management processor 910-2. Such commands may instruct tuners 915 which frequencies are to be used for tuning.

Network interface 920 may be used to communicate via an alternate communication channel with a television service provider, if such communication channel is available. The primary communication channel may be via satellite (which may be unidirectional to receiver 900) and the alternate communication channel (which may be bidirectional) may be via a network, such as the Internet. Referring back to FIG. 1, receiver 150 may be able to communicate with television service provider system 110 via a network, such as the Internet. This communication may be bidirectional: data may be transmitted from receiver 150 to television service provider system 110 and from television service provider system 110 to receiver 150. Referring back to FIG. 9, network interface 920 may be configured to communicate via one or more networks, such as the Internet, to communicate with television service provider system 110 of FIG. 1.

Other information may be transmitted and/or received via network interface 920. For example, commands, data, etc. may be transmitted to accessibility system 951, such as data representing interface elements to be displayed or output by accessibility system 951. For example, accessible interface elements or data corresponding to accessible interface elements may be transmitted to accessibility system 951 by way of network interface 920 for display or output by accessibility system 951. As another example, contextual accessibility elements may be transmitted to accessibility system 951 by way of network interface 920 for display or output by accessibility system 951. It will be appreciated that accessibility system 951 may correspond to an external device separate from receiver 900, such as the accessibility systems 210, 310, 420, 510, 610, and 820 described above.

Storage medium 925 may represent one or more non-transitory computer-readable storage mediums. Storage medium 925 may include memory and/or a hard drive. Storage medium 925 may be used to store information received from one or more satellites and/or information received via network interface 920. Storage medium 925 may store information related to EPG database 930, accessibility module 932 and related preferences, other non-video/audio data 931, DVR database 945, commercial database 946, and/or on-demand programming 927. Recorded television programs may be stored using storage medium 925 as part of DVR database 945. Storage medium 925 may be partitioned or otherwise divided (such as into folders) such that predefined amounts of storage medium 925 are devoted to storage of television programs recorded due to user-defined timers and stored television programs recorded due to provider-defined timers.

EPG database 930 may store information related to television channels and the timing of programs appearing on such television channels. EPG database 930 may be stored using storage medium 925, which may be a hard drive. Information from EPG database 930 may be used to inform users of what television channels or programs are popular and/or provide recommendations to the user. Information from EPG database 930 may provide the user with a visual interface displayed by a television that allows a user to browse and select television channels and/or television programs for viewing and/or recording. Information used to populate EPG database 930 may be received via network interface 920 and/or via satellites, such as satellite 130 of FIG. 1 via tuners 915. For instance, updates to EPG database 930 may be received periodically via satellite. EPG database 930 may serve as an interface for a user to control DVR functions of receiver 900, and/or to enable viewing and/or recording of multiple television channels simultaneously.

Accessibility module 932 may implement various functionality into receiver 900 related to accessibility system 951. For example, accessibility module 932, may allow for direct integration of television channels received by accessibility system 951 into an electronic program guide. Further accessibility module 932 may perform contextual analysis and obtain contextual data for display or output by accessibility system 951, such as to obtain data regarding persons identified in video or audio and prepare the data for transmission to and output by accessibility system 951. As an example, accessibility module 932 may identify a number of persons displayed on screen, a number of speakers speaking, text displayed on screen, words included in audio, etc., and provide this information to accessibility system 951 for output. Additionally, accessibility module 932 may identify interface elements included in a user interface generated by receiver 900 and transmit data relating to the interface elements to accessibility system 951 for output. For example, accessibility module 932 may directly generate accessible interface elements for transmission to accessibility system 951. Accessibility module 932 may also simply transmit data included in the interface element so that accessibility system 951 may process and generate an accessible interface element for output. Optionally, accessibility module 932 may use information included in a transponder stream, such as closed caption information, to generate an accessible interface element for transmission to and output by accessibility system. Accessibility module 932 may further control and store user preferences relating to accessibility features and accessibility system 951, such as which accessibility features are active on a particular accessibility system, or which accessibility features are active for a particular user, or particular settings for various accessibility features, such as font color, font size, font texture, language, audio volume, audio language/dialect, etc.

The network information table (NIT) 940 may store information used by receiver 900 to access various television channels. NIT 940 may be stored locally by a processor, such as tuning management processor 910-2 and/or by storage medium 925. Information used to populate NIT 940 may be received via satellite (or cable) through tuners 915, may be received via network interface 920, such as from the television service provider. As such, information present in NIT 940 may be periodically updated. In some embodiments, NIT 940 may be locally-stored by receiver 900 using storage medium 925. Generally, NIT 940 may store information about a service provider network, such as a satellite-based service provider network. Information that may be present in NIT 940 may include: television channel numbers, satellite identifiers (which may be used to ensure different satellites are tuned to for reception of desired television channels), frequency identifiers, transponder identifiers for various television channels, antenna identifiers (which may be used to ensure different antennas are tuned to for reception of desired television channels), radio frequency identifiers, and/or subchannel identifiers for various television channels. In some embodiments, NIT 940 may contain additional data or additional tables may be stored by the receiver. For example, while specific audio PIDs and video PIDs may not be present in NIT 940, a channel identifier may be present within NIT 940 which may be used to look up the audio PIDs and video PIDs in another table, such as a program map table (PMT). In some embodiments, a PID associated with the data for the PMT is indicated in a separate table, program association table (PAT), which is not illustrated in FIG. 9. A PAT may be stored by the receiver in a similar manner to the NIT. For example, a PMT may store information on audio PIDs, and/or video PIDs. A PMT stores data on ECM (entitlement control message) PIDs for television channels that are transmitted on a transponder stream, transport stream, or digital broadcast. If, for a first television channel, multiple television channels are to be tuned to, NIT 940 and/or PMT 957 may indicate a second television channel that is to be tuned to when a first channel is tuned to; this may allow for switching to output of the second television channel for different commercials, for example.

A table, such as the NIT, PAT, or PMT may store indications of PIDs that are related to supplemental audio content for individual channels or other forms of content. For instance, each television channel may be associated with a different supplemental audio PID. If supplemental audio content is to be transmitted for a given television channel, packets containing the supplemental audio are transmitted to the receiver having its associated supplemental audio content PID. This PID could be distinct from any of the audio programs of the television programming (e.g., the first audio program, second audio program (SAP), actual descriptive audio). In some embodiments, supplemental audio content is transmitted using the same transponder stream as the television channel or content to which the supplemental audio content corresponds. In some embodiments, a single supplemental audio PID is used to identify supplemental audio for multiple television channels, such as all the television channels on a given transponder. A second identifier present within the supplemental audio data may be used to distinguish for which television channel the supplemental audio data corresponds.

Based on information in the NIT, it may be possible to determine the proper satellite and transponder to which to tune for a particular television channel, or to determine the proper antenna and frequency to which to tune to for a particular television channel. In some embodiments, the NIT may list a particular frequency to which to tune for a particular television channel. Once tuned to the proper satellite/transponder/antenna/frequency, the PMT PID may be used to retrieve a program map table that indicates the PIDs for audio and video streams of television channels transmitted by that transponder.

While a large portion of storage space of storage medium 925 may be devoted to storage of television programming, a portion may be devoted to storage of non-audio/video data, such as EPG database 930 and other non-video/audio data 931. This "other" data may permit receiver 900 to function properly. In some embodiments, at least ten gigabytes are allocated to such other data. For example, if NIT 940 is stored by storage medium 925, it may be part of other non-video/audio data 931.

Decoder module 933 may serve to convert encoded video and audio into a format suitable for output to a display device. For instance, Decoder module 933 may receive MPEG video and audio from storage medium 925, network interface 920, or descrambling engine 965 to be output to a television. MPEG video and audio from storage medium 924 may have been recorded to DVR database 945 as part of a previously-recorded television program. Decoder module 933 may convert the MPEG video and audio into a format appropriate to be displayed by a television or other form of display device and audio into a format appropriate to be output from speakers, respectively. Decoder module 933 may have the ability to convert a finite number of television channel streams received from storage medium 925, network interface 920 or descrambling engine 965 simultaneously. For instance, each of decoders 934 within decoder module 933 may be able to only decode a single television channel at a time.

While a television channel is being decoded by a decoder of decoders 934, the television channel is not necessarily output to a display device via television interface 935. For instance, a television channel may be decoded but not output to allow for seamless or near-seamless switching to the television channel when output is desired. For example, if a second television channel is to be output for presentation during commercial breaks on a first television channel, the second television channel and the first television channel may each be continuously decoded by different decoders of decoder module 933 to allow for fast switching between the channels. Without a television channel being continuously decoded, fast switching may be difficult due at least in part to the format in which the channel is encoded. For instance, for MPEG encoding, it may be necessary to first decode an I-frame before certain subsequent (or earlier) received frames may be properly decoded. The output of the decoder, which is provided to television interface 935, may be controlled by control processor 910-1 or some other processor. While decoder module 933 is illustrated as having three decoders 934 (decoder 934-1, decoder 934-2, and decoder 934-3), in other embodiments, a greater or fewer number of decoders may be present in receiver 900.

Television interface 935 may serve to output a signal to a television (or another form of display device) in a proper format for display of video and playback of audio. As such, television interface 935 may output one or more television channels, stored television programming from storage medium 925 (e.g., television programs from DVR database 945, television programs from on-demand programming 927 and/or information from EPG database 930) to a television for presentation.

Digital Video Recorder (DVR) functionality may permit a television channel to be recorded for a period of time. DVR functionality of receiver 900 may be managed by control processor 910-1. Control processor 910-1 may coordinate the television channel, start time, and stop time of when recording of a television channel is to occur. DVR database 945 may store information related to the recording of television channels. DVR database 945 may store timers that are used by control processor 910-1 to determine when a television channel should be tuned to and its programs recorded to DVR database 945 of storage medium 925. In some embodiments, a limited amount of storage medium 925 may be devoted to DVR database 945. Timers may be set by the television service provider and/or one or more users of receiver 900.

DVR database 945 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to receiver 900 via the television provider's network. For example, referring to satellite television distribution system 100 of FIG. 1, in a satellite-based television service provider system, data necessary to create the provider-defined timers at receiver 150 may be received via satellite. It will be appreciated that accessibility systems described herein may be configured to receive and or identify provider-defined timers as interface elements, such as interface elements having a particular focus, and may generate accessible interface elements corresponding to accessible alternative versions of the provider-defined timers.

As an example of DVR functionality of receiver 900 being used to record based on provider-defined timers, a television service provider may configure receiver 900 to record television programming on multiple, predefined television channels for a predefined period of time, on predefined dates. For instance, a television service provider may configure receiver 900 such that television programming may be recorded from 7 to 10 PM on NBC, ABC, CBS, and FOX on each weeknight and from 6 to 10 PM on each weekend night on the same channels. These channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 925 for provider-managed television programming storage.

On-demand programming 927 may represent additional television programming stored by storage medium 925. On-demand programming 927 may include television programming that was not recorded to storage medium 925 via a timer (either user- or provider-defined). Rather, on-demand programming is programming provided to the receiver directly for storage by the receiver and for later presentation to one or more users. On-demand programming 927 may not be user-selected. As such, the television programming stored to on-demand programming storage 927 may be the same for each receiver of a television service provider.

User interface 950 may include a remote control (physically separate from receiver 900) and/or one or more buttons on receiver 900 that allow a user to interact with receiver 900. User interface 950 may be used to select a television channel for viewing, view information from EPG database 930, and/or program a timer stored to DVR database 945, wherein the timer is used to control the DVR functionality of control processor 910-1. User interface 950 may also be used to transmit commands to receiver 900.

Referring back to tuners 915, television channels received via satellite (or cable) may contain at least some scrambled data. Packets of audio and video may be scrambled to prevent unauthorized users (e.g., nonsubscribers) from receiving television programming without paying the television service provider. When a tuner of tuners 915 is receiving data from a particular transponder of a satellite, the transponder stream may be a series of data packets corresponding to multiple television channels. Each data packet may contain a packet identifier (PID), which, in combination with NIT 940 and/or PMT 957, may be determined to be associated with a particular television channel. Particular data packets, referred to as entitlement control messages (ECMs), may be periodically transmitted. ECMs may be associated with another PID and may be encrypted; receiver 900 may use decryption device 960 to decrypt ECMs. Decryption of an ECM may only be possible if the user has authorization to access the particular television channel associated with the ECM. When an ECM is determined to correspond to a television channel being stored and/or displayed, the ECM may be provided to decryption device 960 for decryption.

Decryption device 960 may be a removable or non-removable smart card. When decryption device 960 receives an encrypted ECM, decryption device 960 may decrypt the ECM to obtain some number of control words. In some embodiments, from each ECM received by decryption device 960, two control words are obtained. In some embodiments, when decryption device 960 receives an ECM, it compares the ECM to the previously received ECM. If the two ECMs match, the second ECM is not decrypted because the same control words would be obtained. In other embodiments, each ECM received by decryption device 960 is decrypted; however, if a second ECM matches a first ECM, the outputted control words will match; thus, effectively, the second ECM does not affect the control words output by decryption device 960. Decryption device 960 may be permanently part of receiver 900 or may be configured to be inserted and removed from receiver 900. In some embodiments, control processor 910-1, tuning management processor 910-2, or other hardware may be able to determine that a received ECM has not changed from the previous iteration, and therefore not provide the repeated ECM to the smart card, since the same control word(s) will be obtained.

Tuning management processor 910-2 may be in communication with tuners 915 and control processor 910-1. Tuning management processor 910-2 may be configured to receive commands from control processor 910-1. Such commands may indicate when to start/stop recording a television channel and/or when to start/stop causing a television channel to be output to a television. Tuning management processor 910-2 may control tuners 915. From tuners 915, tuning management processor 910-2 may receive transponder streams of packetized data. From network interface 920, tuning management processor 910-2 may receive network transport stream of packetized data. As previously detailed, some or all of these packets may include a PID that identifies the content of the packet.

Tuning management processor 910-2 may be configured to create one or more PID filters 955 that sort packets received from tuners 915 and/or network interface 920 based on the PIDs. When a tuner is initially tuned to a particular frequency (e.g., to a particular transponder of a satellite), a PID filter may be created based on the PMT data. The PID created, based on the PMT data packets, may be known because it is stored as part of NIT 940 or another table, such as a program association table (PAT). From the PMT data packets, PMT may be constructed by tuning management processor 910-2.

PID filters 955 may be configured to filter data packets based on PIDs. In some embodiments, PID filters 955 are created and executed by tuning management processor 910-2. For each television channel to be output for presentation or recorded, a separate PID filter may be configured. In other embodiments, separate hardware may be used to create and execute such PID filters. Depending on a television channel selected for recording/viewing, a PID filter may be created to filter: (1) the video packets associated with the television channel; (2) the audio packets associated with the television channel; and (3), if enabled, supplemental audio content for use in conjunction with interactive content. PMT 957 may store the particular assignments of PIDs for individual television channels. For example, if a transponder data stream includes multiple television channels, data packets corresponding to a television channel that is not desired to be stored or displayed by the user may be ignored by PID filters 955 and not routed to descrambling engine 965, decryption device 960 or control processor 910-1. As such, only data packets corresponding to the one or more television channels desired to be stored and/or displayed may be filtered and passed to either descrambling engine 965 or decryption device 960; other data packets may be ignored. For each television channel, a stream of video packets, a stream of audio packets (one or both of the audio programs), a stream of supplemental audio content, and/or a stream of ECM packets may be present, each stream identified by a PID. In some embodiments, a common ECM stream may be used for multiple television channels. Additional data packets corresponding to other information, such as updates to NIT 940, may be appropriately routed by PID filters 955. At a given time, one or multiple PID filters may be executed by tuning management processor 910-2.

Descrambling engine 965 may use the control words output by decryption device 960 in order to descramble video and/or audio corresponding to television channels for storage and/or presentation. Video and/or audio data contained in the transponder data stream received by tuners 915 may be scrambled. Video and/or audio data may be descrambled by descrambling engine 965 using a particular control word. Which control word output by decryption device 960 to be used for successful descrambling may be indicated by a scramble control identifier present within the data packet containing the scrambled video or audio. Descrambled video and/or audio may be output by descrambling engine 965 to storage medium 925 for storage (in DVR database 945) and/or to decoder module 933 for output to a television or other presentation equipment via television interface 935.

For simplicity, receiver 900 of FIG. 9 has been reduced to a block diagram; commonly known parts, such as a power supply, have been omitted. Further, some routing between the various modules of receiver 900 has been illustrated. Such illustrations are for exemplary purposes only. The state of two modules not being directly or indirectly connected does not indicate the modules cannot communicate. Rather, connections between modules of the receiver 900 are intended only to indicate possible common data routing. It should be understood that the modules of receiver 900 may be combined into a fewer number of modules or divided into a greater number of modules.

Figure 10:
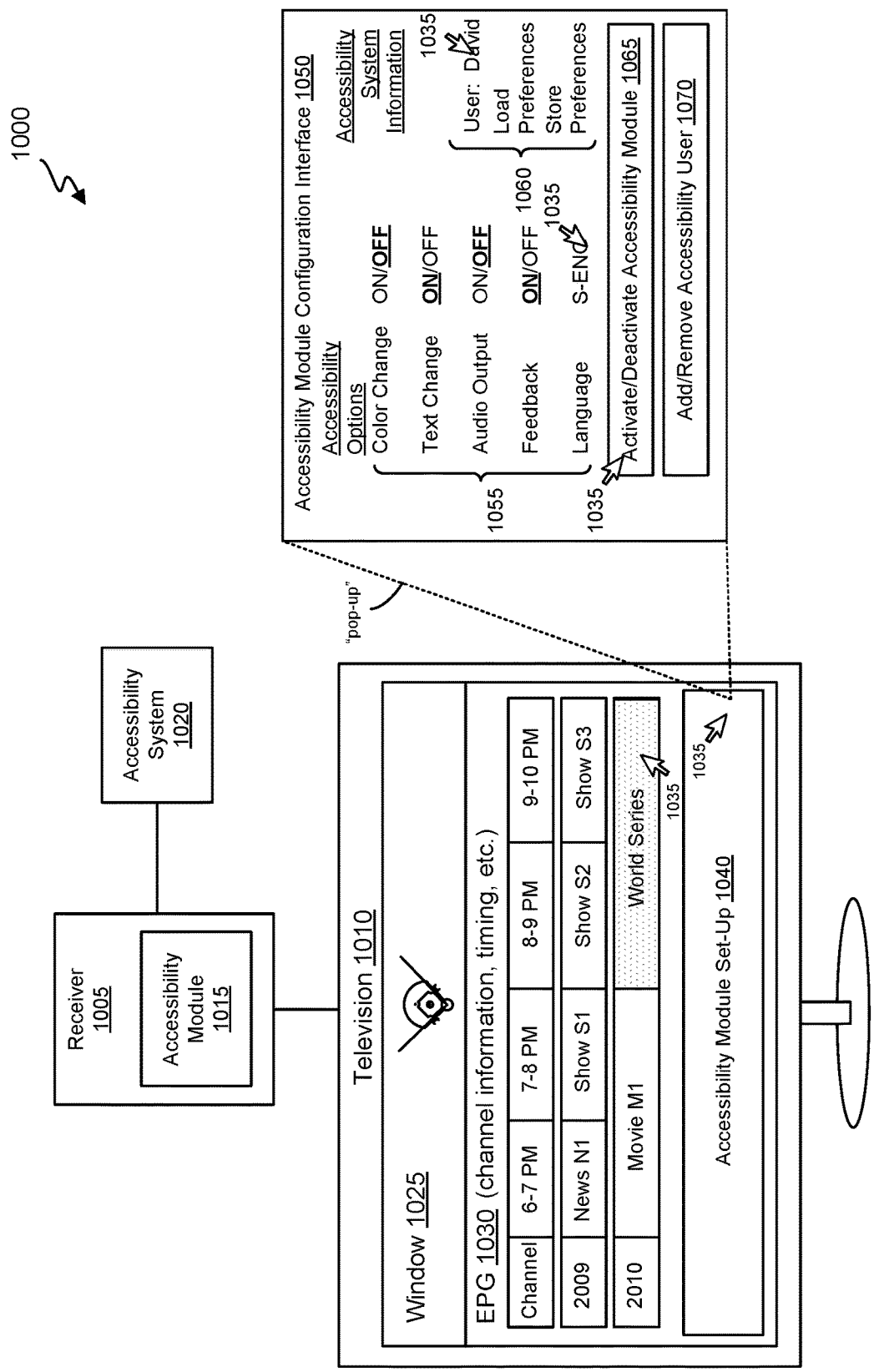
FIG. 10 provides a schematic illustration of aspects of a receiver incorporating an accessibility module for use with an accessibility system, in accordance with some embodiments.

FIG. 10 depicts an example television display environment 1000. Display environment 1000 includes a receiver 1005 that generates a user interface for output by television 1010. Receiver 1005 includes accessibility module 1015, which may provide data related to accessibility interface elements to accessibility system 1020 for output.

In FIG. 10, television 1010 displays a window 1025 that includes video, such as video corresponding to a television channel received from a cable, satellite, or over-the air broadcast system. Television 1010 also displays an electronic program guide (EPG) 1030, which corresponds to channel information, timing of programs, and the like, for television programs and channels that may be displayed by receiver 1005 and television 1010. As illustrated, the EPG 1030 identifies a first channel "2009," which may correspond, for example, to a first television channel, and a second channel "2010," which may correspond, for example, to a second television channel. Items in the EPG 1030 may be selectable using a user interface that may make use of a remote control or other input device to interact with EPG 1030. As illustrated, indicator 1035 may highlight, as an example program, the World Series for immediate display on television 1010, such as in window 1025. Other features may also be implemented using the interface displayed, such as selection of recording one or more television channels or programs for storage to a DVR database.

The display interface may also include an item 1040 to access accessibility module setup interface 1050, which may allow for selection of a command for the receiver to configure the accessibility module 1015, for example. As an example, selection of the command to configure the accessibility module 1015, may generate a "pop-up" window or other interface that allows for interaction and control over configuration or information aspects relating to accessibility module 1015 and accessibility system 1020. In the accessibility module configuration interface 1050 that is generated, options 1055 may be selected, activated, changed, or displayed, for example. Useful options 1055 may include, but are not limited to, activation, deactivation, and/or configuration of a color change, such as to facilitate use of accessible interface elements by a color blind or low vision user, activation, deactivation, or configuration of a text change, such as to facilitate accessible interface elements by a color blind or low vision user, activation, deactivation, or configuration of feedback, such as to facilitate confirmation of input entry, activation, deactivation, or configuration of a language. It will be appreciated that selection of a particular language may allow the accessible interface elements to be output in the particular language, which may provide translation services to a user. For example, a user that can only read/speak French may select the French language so that accessible interface elements are output in French. As illustrated in FIG. 10, a simplified language option may also be available, such as simplified English (S-ENG), which may provide for accessible interface elements to be output in a simplified language so that a user may be better able to understand the contents.

Also included in accessibility module configuration interface 1050 may be an informational item 1060 that may provide for selection of a particular user, loading of preferences, storing of preferences. Optionally, informational item 1060 may provide additional information regarding accessibility system 1020, such as operational or network characteristics, which may be useful in facilitating configuration, support, or troubleshooting of accessibility system 1020 and accessibility module 1015.

Accessibility module configuration interface 1050 may also include an option 1065 for activating or deactivating the accessibility module 1015, such as to add/or remove interface features of receiver 1005 that relate to accessibility module 1015 and/or accessibility system 1020. Accessibility module configuration interface 1050 may also include an option 1070 for adding, removing, or editing users associated with accessibility module 1015 and/or accessibility system 1020.

Figure 11:
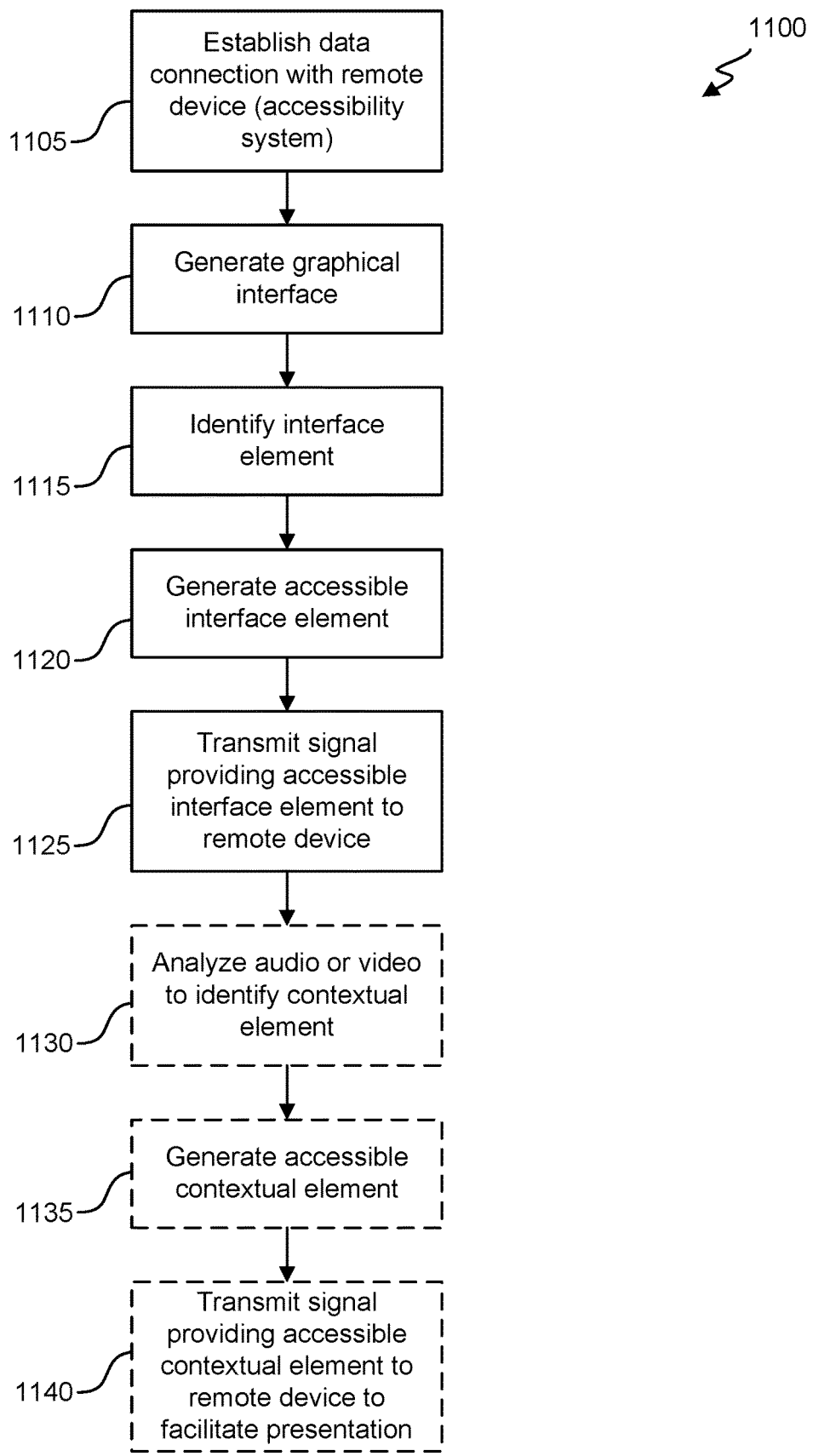
FIG. 11 provides an overview of a method for operating a receiver that incorporates accessibility features, in accordance with some embodiments.

FIG. 11 provides an overview of an exemplary method 1100 for operating a set top box of some embodiments, such as a receiver, television receiver, over-the-top receiver, etc. At block 1105, the method includes establishing a data connection with a remote device, such as an accessibility system. The data connection may correspond to a wired or wireless connection. The data connection may correspond to a network connection.

At block 1110, the method includes generating a graphical interface, such as a graphical interface of the set top box. At block 1115, an interface element may be identified. The interface element may correspond to an interface element having focus. The interface element may correspond to an interface element lacking focus. In various embodiments, multiple interface elements are identified.

At block 1120, an accessible interface element is generated using the identified interface element. Optionally, multiple accessible interface elements are generated. For example, an accessible interface element may correspond to a different presentation of an interface element, such as to facilitate presentation to and/or use by a user. Optionally, the accessible interface element corresponds to an interface element having focus. Optionally the accessible interface element corresponds to an interface element lacking focus.

At block 1125, a signal is transmitted by the set top box, such as a signal including or providing the an interface element to a remote device, such as an accessibility system. For example, the interface element may correspond to the identified interface element or an accessible interface element. Optionally, the accessible interface element is generated by a remote device, such as an accessibility system upon receipt of the interface element. In this way, either or both the set top box and the accessibility system may be used to generate the accessible interface element. It will be appreciated that the embodiments described where a set-top box generates an accessible interface element corresponds to only some embodiments and that in some other embodiments the accessible system generates accessible interface elements on its own without the aid of a set-top box.

At block 1130, optionally, audio and/or video from the set top box is analyzed to identify a contextual element, as described above with reference to FIGS. 7-8. At block 1135, the contextual element may be used to generate an accessible contextual element. In various embodiments, the contextual element may be transmitted to a remote device to facilitate presentation of an accessible contextual element. Optionally, the contextual element may be used to generate an accessible contextual element by the set top box. Optionally, a signal including or providing the accessible contextual element may be transmitted to a remote device, such as an accessibility system, to facilitate presentation, such as an audio or video presentation.

Figure 12:
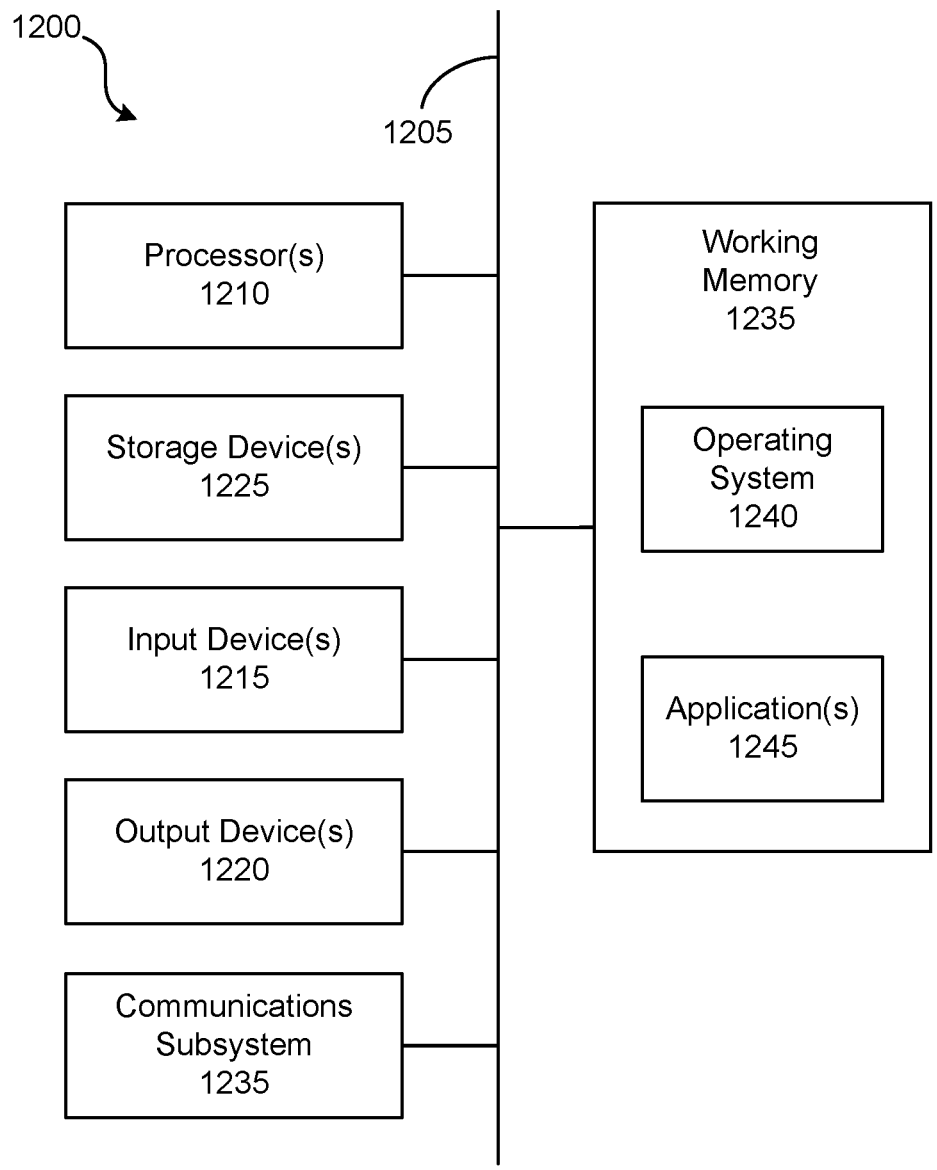
FIG. 12 provides a block diagram of an example computing device, in accordance with some embodiments.

A computing device as illustrated in FIG. 12 may be incorporated as part of the previously described computerized devices, such as television service provider system 110, content provider system 111, receiver 150, a television, a set-top box, accessibility system 951, etc. FIG. 12 provides a schematic illustration of one embodiment of a computing device 1200 that may perform various steps of the methods provided by various embodiments. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computing device 1200 is shown comprising hardware elements that may be electrically coupled via a bus 1205 (or may otherwise be in communication). The hardware elements may include one or more processors 1210, including without limitation one or more general-purpose processors and/or one or more special-purpose processors (such as digital signal processing chips, graphics acceleration processors, video decoders, and/or the like); one or more input devices 1215, which may include without limitation a mouse, a touchscreen, keyboard, remote control, voice input, and/or the like; and one or more output devices 1220, which may include without limitation a display device, a printer, speaker, etc.

The computing device 1200 may further include (and/or be in communication with) one or more non-transitory storage devices 1225, which may comprise, without limitation, local and/or network accessible storage, and/or may include, without limitation, a disk drive, a drive array, an optical storage device, a solid-state storage device, such as a solid state drive ("SSD"), random access memory ("RAM"), and/or a read-only memory ("ROM"), which may be programmable, flash-updateable and/or the like. Such storage devices may be configured to implement any appropriate data stores, including without limitation, various file systems, database structures, and/or the like.

The computing device 1200 might also include a communications subsystem 1230, which may include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), a G.hn device, and/or the like. The communications subsystem 1230 may permit data to be exchanged with a network (such as the network described below, to name one example), other computer systems, and/or any other devices described herein. In many embodiments, the computing device 1200 will further comprise a working memory 1235, which may include a RAM or ROM device, as described above.

The computing device 1200 also may comprise software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1225 described above. In some cases, the storage medium might be incorporated within a computer system, such as computing device 1200. In other embodiments, the storage medium might be separate from a computer system (e.g., a removable medium, such as a compact disc, or a cloud- or network-based storage system), and/or provided in an installation package, such that the storage medium may be used to program, configure, and/or adapt a general purpose computer with the instructions/code stored thereon. These instructions might take the form of executable code, which is executable by the computing device 1200 and/or might take the form of source and/or installable code, which, upon compilation and/or installation on the computing device 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computing device (such as the computing device 1200) to perform methods in accordance with various embodiments of the invention. According to a set of embodiments, some or all of the procedures of such methods are performed by the computing device 1200 in response to processor 1210 executing one or more sequences of one or more instructions (which might be incorporated into the operating system 1240 and/or other code, such as an application program 1245) contained in the working memory 1235. Such instructions may be read into the working memory 1235 from another computer-readable medium, such as one or more of the non-transitory storage device(s) 1225. Merely by way of example, execution of the sequences of instructions contained in the working memory 1235 might cause the processor(s) 1210 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computing device 1200, various computer-readable media might be involved in providing instructions/code to processor(s) 1210 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1225. Volatile media include, without limitation, dynamic memory, such as the working memory 1235.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer may read instructions and/or code. Network-based and cloud-based storage systems may also be useful forms of computer-readable media.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 1200.

The communications subsystem 1230 (and/or components thereof) generally will receive signals, and the bus 1205 then might carry the signals (and/or the data, instructions, etc. carried by the signals) to the working memory 1235, from which the processor(s) 1210 retrieves and executes the instructions. The instructions received by the working memory 1235 may optionally be stored on a non-transitory storage device 1225 either before or after execution by the processor(s) 1210.

It should further be understood that the components of computing device 1200 may be distributed across a network. For example, some processing may be performed in one location using a first processor while other processing may be performed by another processor remote from the first processor. Other components of computing device 1200 may be similarly distributed. As such, computing device 1200 may be interpreted as a distributed computing system that performs processing in multiple locations. In some instances, computing device 1200 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages or steps or modules may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    obtaining, by an image capture device, an image of a user interface of a consumer electronic device, the user interface being an electronic program guide comprising a plurality of interface elements each to facilitate a corresponding user interaction with a feature of the consumer electronic device relating to the electronic program guide;
    analyzing the image, responsive to the obtaining, to identify an interface element of the plurality of interface elements and to identify the feature of the consumer electronic device corresponding to the identified interface element;
    generating, responsive to the analyzing, instructions executable by a computing device separate from the consumer electronic device to define an accessible interface element as associated with a different audio or visual presentation than that of the identified interface element by which to provide at least a different user interaction with the feature of the consumer electronic device corresponding to the identified interface element; and
    executing the instructions by the computing device to output the accessible interface element in accordance with providing, via the computing device, at least the different user interaction with the feature of the consumer electronic device corresponding to the identified interface element.

2. The method of claim 1, further comprising:
    receiving input corresponding to identification of the interface element; and
    wirelessly transmitting a command to facilitate selection of the interface element in the graphical interface.

3. The method of claim 2, further comprising:
    receiving the command at an actuation device; and
    actuating a physical input device using the actuation device to facilitate selection of the interface element in the user interface.

4. The method of claim 2, further comprising:
    outputting a second audio or visual output to confirm selection of the interface element or outputting a tactile output to confirm selection of the interface element.

5. The method of claim 1, further comprising:
    receiving input corresponding to selection of a second interface element;
    generating a second accessible interface element using the second interface element to facilitate use by the user; and
    outputting a second audio or visual output of the second accessible interface element.

6. The method of claim 1, further comprising:
    receiving input corresponding to selection of a second interface element;
    receiving input corresponding to a command to ignore the second interface element.

7. The method of claim 1, further comprising:
    obtaining a second image of the graphical interface using the image capture device;
    analyzing the image of the graphical interface and the second image of the graphical interface to identify a change to the graphical interface; and
    determining element focus in the graphical interface based on the change.

8. The method of claim 1, wherein the accessible interface element corresponds to an audio version of the interface element, wherein the accessible interface element corresponds to a text version of an audio interface element, wherein the accessible interface element corresponds to an alternative color version of the interface element, wherein the accessible interface element corresponds to a magnified version of the interface element, wherein the accessible interface element corresponds to a simplified language version of the interface element, wherein the accessible interface element corresponds to a translated language version of the interface element, wherein the accessible interface element corresponds to a version of text having a second font size greater than a first font size of text in the interface element, wherein the accessible interface element corresponds to a version of text having a second texture different from a first texture of text in the interface element, or wherein the accessible interface element corresponds to a version of text having a second font style different from a first font style of text in the interface element.

9. The method of claim 1, further comprising:
generating a graphical interface providing a selectable element, wherein the selectable element corresponds to a type of the accessible interface element;
receiving input corresponding to a particular selection of the selectable element, wherein generating the accessible interface element includes using the interface element and the type corresponding to the particular selection of the selectable element.

10. The method of claim 1, further comprising:
obtaining audio output generated by the consumer electronic device using an audio capture device;
analyzing the audio to identify a contextual element in the audio;
generating an accessible contextual element using the contextual element, wherein the accessible contextual element corresponds to a different presentation of the contextual element to facilitate presentation to the user; and
outputting an audio or visual output of the accessible contextual element.

11. The method of claim 1, further comprising:
obtaining a second image corresponding to a video presentation of the consumer electronic device using the image capture device;
analyzing the second image to identify a contextual element;
generating an accessible contextual element using the contextual element, wherein the accessible contextual element corresponds to a different presentation of the contextual element to facilitate presentation to the user; and
outputting an audio or visual output of the accessible contextual element.

12. The method of claim 1, wherein the computing device comprises the image capture device.

13. The method of claim 1, wherein the user interface comprises a plurality of physical interface elements disposed on the consumer electronic device.

14. The method of claim 1, wherein the user interface comprises a plurality of graphical interface elements displayed on the consumer electronic device.

15. A system, comprising:
one or more processors; and
a non-transitory computer readable storage medium in data communication with the one or more processors, wherein non-transitory computer readable storage medium includes processor-readable instructions that, when executed by the one or more processors, cause the one or more processors to perform operations including:
obtaining, by an image capture device, an image of a user interface of a consumer electronic device, the user interface being an electronic program guide comprising a plurality of interface elements each to facilitate a corresponding user interaction with a feature of the consumer electronic device relating to the electronic program guide;
analyzing the image, responsive to the obtaining, to identify an interface element of the plurality of interface elements and to identify the feature of the consumer electronic device corresponding to the identified interface element;
generating, responsive to the analyzing, instructions executable by a computing device separate from the consumer electronic device to define an accessible interface element as associated with a different audio or visual presentation than that of the identified interface element by which to provide at least a different user interaction with the feature of the consumer electronic device corresponding to the identified interface element; and
executing the instructions by the computing device to output the accessible interface element in accordance with providing, via the computing device, at least the different user interaction with the feature of the consumer electronic device corresponding to the identified interface element.

16. The system of claim 15, further comprising:
the image capture device, wherein the image capture device is positioned in data communication with the one or more processors.

17. A receiver comprising:
one or more processors;
an audio-video output interface in data communication with the one or more processors;
a network interface in data communication with the one or more processors; and
a non-transitory computer readable storage medium in data communication with the one or more processors, wherein non-transitory computer readable storage medium includes processor-readable instructions that, when executed by the one or more processors, cause the one or more processors to perform operations including:
establishing a data connection with a remote computing device using the network interface;
generating a graphical interface for output by a presentation device using the audio-video output interface, the graphical interface being an electronic program guide comprising a plurality of interface elements each to facilitate a corresponding user interaction with a feature of the receiver relating to the electronic program guide;
identifying an interface element of the plurality of interface elements of the graphical interface;
generating instructions executable by the remote computing device to define an accessible interface element as associated with a different audio or visual presentation than that of the identified interface element by which to provide at least a different user interaction with the feature of the receiver corresponding to the identified interface element; and
transmitting to the remote computing device, using the network interface, a signal providing the instructions executable by the remote computing device to define the accessible interface element to facilitate presentation of the accessible interface element to a user for providing at least the different user interaction with the feature of the receiver corresponding to the identified interface element.

18. The receiver of claim 17, wherein the accessible interface element corresponds to an audio version of the interface element, wherein the accessible interface element corresponds to a magnified version of the interface element, wherein the accessible interface element corresponds to an alternative color version of the interface element, wherein the accessible interface element corresponds to a simplified language version of the interface element, wherein the accessible interface element corresponds to a translated language version of the interface element, wherein the accessible interface element corresponds to a version of text having a second font size greater than a first font size of text in the interface element, wherein the accessible interface element corresponds to a version of text having a second font style different from a first font style of text in the interface element, or wherein the accessible interface element corresponds to a version of text having a second texture different from a first texture of text in the interface element.

19. The receiver of claim 17, wherein the operations further include:
- analyzing audio received at or generated by the receiver to identify a contextual element in the audio;
- generating an accessible contextual element using the contextual element, wherein the accessible contextual element corresponds to a different presentation of the contextual element to facilitate presentation to the user; and
- transmitting, using the network interface, a signal providing the accessible contextual element to the remote computing device to facilitate an audio or visual presentation of the accessible interface element to the user.

20. The receiver of claim 17, wherein the operations further include:
- analyzing video received at or generated by the receiver to identify a contextual element in the video;
- generating an accessible contextual element using the contextual element, wherein the accessible contextual element corresponds to a different presentation of the contextual element to facilitate presentation to the user; and
- transmitting, using the network interface, a signal providing the accessible contextual element to the remote computing device to facilitate an audio or visual presentation of the accessible interface element to the user.

* * * * *